INVENTORS
SEYMOUR KLEIN &
JOHN P. BELTZ
BY John V. Regan
Attorney

COMPLETE TRUTH TABLE

| | UL | LL | UR | LR | MCS | LCS | $H_1$ | $H_2$ | $H_3$ | LWG | 1BC | 3BC | $VZ_3$ |
|---|---|---|---|---|---|---|---|---|---|---|---|---|---|
| 1 | − | − | − | + | − | + | | | + | + | + | − | + |
| 2 | − | + | + | − | − | − | | | + | − | − | + | + |
| 3 | − | − | + | + | − | − | | | + | − | − | + | + |
| 4 | + | − | − | + | − | − | | | + | − | + | − | + |
| 5 | + | − | − | + | − | − | | | + | − | − | + | + |
| 6 | + | + | − | + | − | − | | | + | − | − | − | + |
| 7 | − | − | + | − | + | − | | | + | − | − | − | + |
| 8 | + | + | + | + | − | − | | | + | − | − | + | + |
| 9 | + | − | + | + | − | − | | | + | − | − | − | + |
| 0 | + | + | + | + | − | − | | | + | + | − | − | + |
| $ | − | − | − | − | − | + | | | + | − | − | − | + |
| * | − | − | − | − | + | − | | + | | − | − | − | + |
| - | − | − | − | − | − | − | + | | | + | + | − | + |
| . | − | − | − | − | − | − | + | | | + | + | − | − |

INVENTORS
SEYMOUR KLEIN &
JOHN P. BELTZ
BY John V. Regan
Attorney

INVENTORS
SEYMOUR KLEIN &
JOHN P. BELTZ
BY John V. Regan
Attorney

INVENTORS
SEYMOUR KLEIN &
JOHN P. BELTZ
BY John V. Regan
Attorney

INVENTORS
SEYMOUR KLEIN &
JOHN P. BELTZ
BY John V. Regan
Attorney

INVENTORS
SEYMOUR KLEIN &
JOHN P. BELTZ
BY John V. Regan
Attorney

INVENTORS
SEYMOUR KLEIN &
JOHN P. BELTZ
BY John V. Regan
Attorney

INVENTORS
SEYMOUR KLEIN &
JOHN P. BELTZ
BY John V. Regan
ATTORNEY

RECOGNITION TRUTH TABLE

| | UL | LL | UR | LR | MCS | LCS | $H_1$ | $H_2$ | $H_3$ | LWG | 1BC | 3BC | $VZ_3$ |
|---|---|---|---|---|---|---|---|---|---|---|---|---|---|
| 0 | | + | + | + | | − | | | + | + | | | |
| 0 | + | + | | | | − | | | + | + | − | − | |
| 1 | | | − | + | | + | | | + | | | | |
| 2 | − | | + | − | − | − | | | + | | | | |
| 2 | − | + | | − | − | − | | | + | − | − | | |
| 3 | − | − | + | + | | − | | | + | − | | | |
| 4 | + | − | − | | − | − | | | + | | + | | |
| 5 | + | − | − | | | − | | | + | | − | | |
| 6 | | + | − | + | | − | | | + | | + | | |
| 6 | | + | − | + | | − | | | + | − | − | − | |
| 6 | + | + | − | | | − | | | + | − | | − | |
| 7 | − | | + | − | + | − | | | + | | | | |
| 8 | + | + | + | + | | − | | | + | − | | | |
| 8 | + | | + | + | | − | | | + | − | | + | |
| 8 | + | + | | | | − | | | + | − | | + | |
| 8 | | + | + | + | | − | | | + | − | − | | |
| 9 | + | − | + | + | | − | | | + | − | | − | |
| 9 | + | − | + | | | − | | | + | − | − | − | |
| ⑆ | | | − | − | | + | | | + | | | | |
| * | | | | | + | | | + | | | | | + |
| — | | | | | | | + | | | + | + | | + |
| · | | | | | | | | | − | | | | − |

Fig. 10.

INVENTORS
SEYMOUR KLEIN &
JOHN P. BELTZ
BY John V. Regan
Attorney

INVENTORS
SEYMOUR KLEIN &
JOHN P. BELTZ
BY John V. Regan
Attorney

United States Patent Office 3,293,604

Patented Dec. 20, 1966

3,293,604

CHARACTER RECOGNITION SYSTEM UTILIZING ASYNCHRONOUS ZONING OF CHARACTERS

Seymour Klein, Philadelphia, Pa., and John P. Beltz, Levittown, N.J., assignors to Radio Corporation of America, a corporation of Delaware Filed Jan. 25, 1963, Ser. No. 253,911
19 Claims. (Cl. 340—146.3)

The invention relates to character readers, and more particularly to character recognition methods and circuits for use in such readers.

Character reading systems are arranged to scan information characters or symbols to produce a distinctive set of signals when different characters are scanned. The character reader then operates to translate the recognized characters into a digitalized code representing the characters, for storing in a storage medium or for processing by a computer.

The characters to be read from a document may, for example, be printed by a computer-operated high-speed printer of the stylus type, the drum type, or the like. Such high-speed printers frequently utilize type-bars, which are selectively energized to strike an inked ribbon so as to produce inked impressions on the document being printed. In a drum printer, each type-bar forms a complete character. In a stylus printer, a plurality of styli are arranged in a matrix configuration so that, when various combinations of the styli are energized, a plurality of inked impressions are formed on the document. The aggregate of the impressions from the stylus printer form a complete character.

Each type of printer tends to produce character distortions. For example, drum printers frequently print characters with the tops or bottoms thereof missing, whereas stylus printers produce characters which vary appreciably in width. In each type of printer, misalignment of the characters frequently occurs. Additionally, the size of the characters formed by each printer depends on the quantity of ink contained in the ribbon and thus the age thereof. All of these irregularities cause severe difficulties in recognizing the characters being read.

Accordingly, it is an object of this invention to provide an improved character reader capable of recognizing distorted characters.

It is another object of this invention to provide an improved character reader capable of reading and recognizing characters which are distorted, misaligned, and vary appreciably in width, and height.

In an embodiment of the invention, characters linearly printed on a document are transported past an electro-optical pick-up device which is positioned to vertically scan the characters in succession. The characters are appreciably overscanned in both the vertical and horizontal directions so as to obviate any problems due to misalignment of the characters. The characters are recognized by the distinctive sets of output signals produced by the pick-up device when different characters are scanned.

The recognition of the characters is predicated on the fact that one of the major features which differentiates one character from another are the vertical strokes which comprise a major portion of the right and left vertical boundaries of a character, as well as the center portion of some characters. Furthermore, a stylized font may be utilized in the printing of the characters to emphasize the vertical strokes in characters. The minor features of a character, such as, the horizontal strokes or bars which may, for example, comprise the sole remaining inked features of the character, are also relied upon to distinguish one character from another but not to the same extent as the vertical strokes. This is because the top or bottom horizontal strokes of a character are frequently omitted or distorted when printed by a high-speed printer while the vertical strokes are rarely omitted.

The various portions or zones of a character are scanned successively by the electro-optical pick-up device to produce a character image signal in which electronic representations of the major and minor features occur serially. The feature signal portions of the character image signal are stored in different storage mediums or feature detectors pending the completion of the scanning of the character. At the end of the scanning of the character, the stored signals, which are the aggregate of all the features of the character, are applied to a decoder which comprises a physical exemplification of the truth table for the various features of the characters. The decoder produces an output signal representing the character when the character is recognized.

A recognition system embodying the invention, however, requires that the detected vertical strokes be accurately identified as occurring in the right, left or center portions or zones of a character, so as to be stored in the proper storage medium. If all characters are printed with the same width, this would be no problem since a count of the scan lines, after the scanning of a character has begun, would accurately correspond to the various character portions. However, since many printers produce characters which vary in dimensions, a center vertical stroke may easily be identified as either a left or a right vertical stroke.

Accordingly, in the embodiment of the invention, the characters are asynchronously zoned. A character classification circuit is included in the recognition system to classify each character into a plurality of categories based on the detection and width of a vertical stroke occurring in the first zone that is scanned. This classification establishes the numbers of scan lines that will occur in the left, center and right zones of a character. The characters are therefore asynchronously zoned depending on their classification. By knowing accurately which zone of the character is being scanned, the signals representing features which occur in this zone are stored in the correct storage medium and no confusion arises over what feature has been detected.

Accordingly, it is another object of this invention to provide a character reader which classifies each character on the document being read into one of a plurality of categories based on the detection of a selected feature in the characters.

It is still another object of this invention to provide a character reader which automatically and asynchronously divides each character on the document being read into a plurality of zones.

It is a further object of this invention to provide a character reader which classifies each character on the document being read into one of a plurality of categories and then asynchronously zones each character based on the classification of the character.

It is a further object of this invention to provide a character reader which emphasizes vertical stroke detection in the recognition of a character.

It is still a further object of this invention to provide a character reader in which signals representing the same feature of a character are stored in the same location.

It is still a further object of this invention to provide a character reader which can tolerate appreciable skewing of the document being read.

The novel features which are considered to be characteristic of this invention are set forth with particularity in the appended claims. The invention, itself, however, both as to its organization and method of operation as well as to additional objects and advantages thereof, will best be understood from the following description when read in conjunction with the accompanying drawings, in which:

Figure 9:
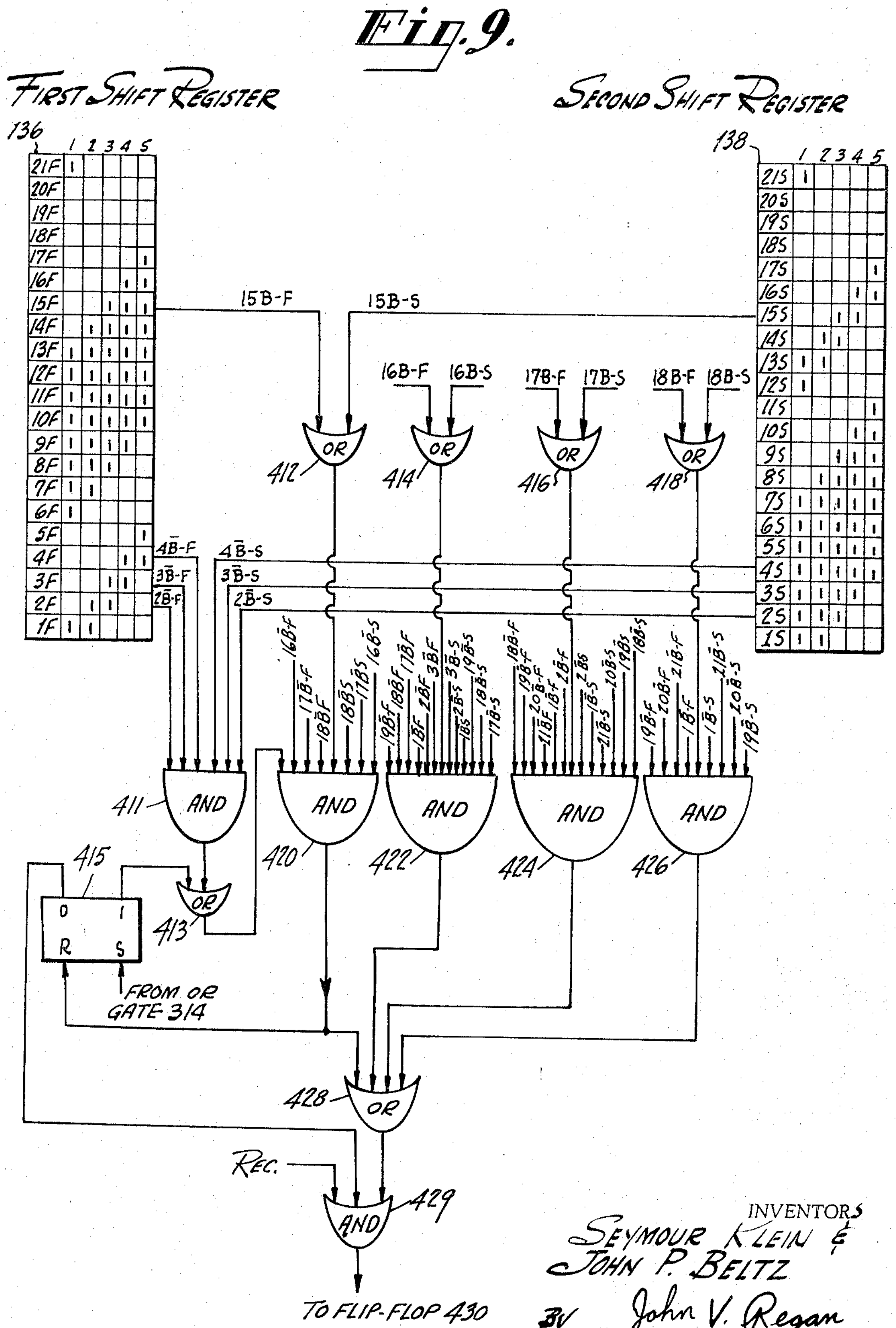
Figure 11:
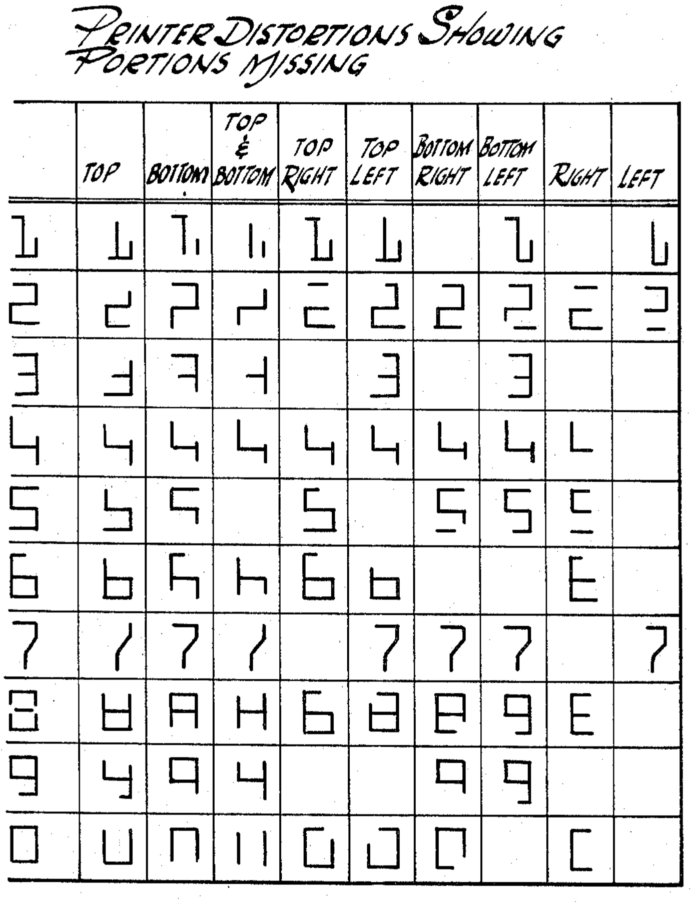

FIGURE 7, comprising FIGURES 7*a*, 7*b*, 7*c* and 7*d*, is a schematic block diagram of a character recognition system embodying the invention;

FIGURES 8*a* through 8*e* are diagrammatic illustrations of some impressions on a document that will and will not be detected as the start of a character being read;

FIGURE 9 is a block diagram of a positioning circuit utilized in the character recognition system of FIGURE 7;

FIGURE 10 is a truth table utilized in the character recognition system of FIGURE 7; and FIGURE 11 is a tabulation of some distorted characters that will be recognized by the character recognition system of FIGURE 7.

GENERAL

Figures 1, 2, 4, 6:
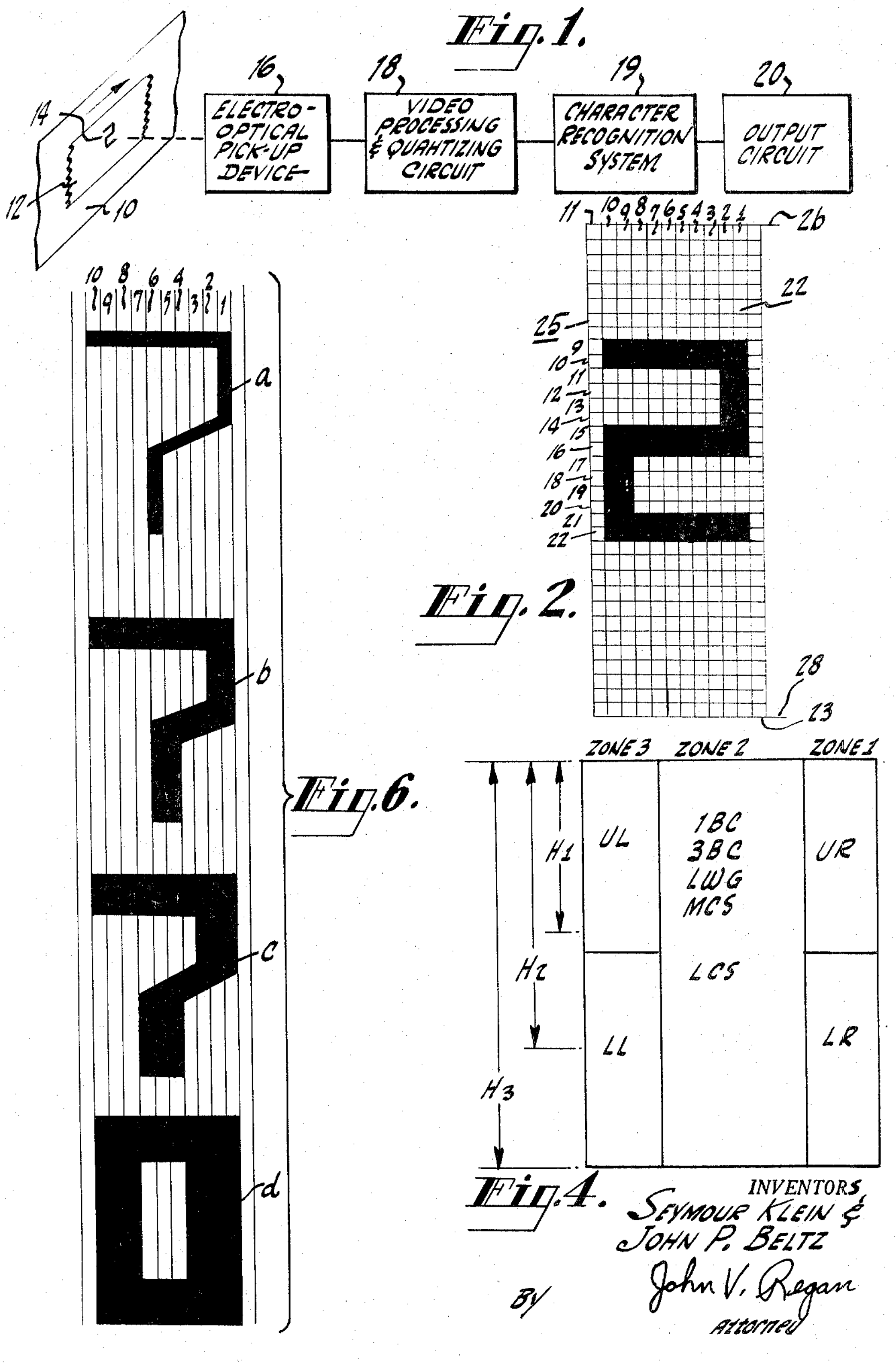
FIGURE 1 is a schematic block diagram of a character reading system embodying the invention.
FIGURE 2 is a diagrammatic illustration of the scanning of an individual character in the character reading system of FIGURE 1.
FIGURE 4 is a diagrammatic illustration of the division of a character into zones and the features which are searched for in each zone.
FIGURE 6 is a somewhat idealized illustration of the categories into which a character is classified by a recognition system embodying the invention.

Referring to FIGURE 1, a schematic block diagram of a character reading system is illustrated. The system includes a transport mechanism 10 for carrying a document 12 having characters 14 printed thereon. The transport mechanism 10 moves at a substantially constant velocity, in the direction of the arrow shown thereon, past the front of an electro-optical pickup device 16, which device is positioned to scan the characters 14. The pickup device 16 may comprise a photoconductive camera tube such as a vidicon camera tube, or a flying spot scanner, etc. The output or video signals derived from the electro-optical pickup device 16 include feature signal portions representative of the features of the characters being scanned. The video signals are applied to a video processing and quantizing circuit 18 which processes the video signals to provide uniform amplitude pulses having fast rise and fall times. A representative pickup device 16 and video processing and quantizing circuit 18 have been disclosed in a copending application for Seymour Klein, entitled "Optical Scanning System for Character Reader," filed November 15, 1962, Serial No. 237,949, and assigned to the same assignee as the present application. The quantized video signals are then applied to a character recognition system 19 wherein the signals are recognized as particular characters and encoded into a digitalized form, such as a binary coded form. The coded output signals from the character recognition system 19 are applied to an output circuit 20 which may, for example, comprise a storage medium for storing the signals, or a computer for further processing the signals.

CHARACTER SCANNING

In FIGURE 2 is shown the manner in which an individual character, the numeral 2 is scanned by the electro-optical pickup device 16. The area surrounding the character as well as the character itself, are shown divided into a plurality of square segments or elements 22. The area of each of the elements 22 is substantially equal to or greater than the resolution of the image pickup device 16. In scanning a character being read, the pickup device 16 is deflected vertically so that the character is scanned from top to bottom while simultaneously the character is moved from left to right by the transport mechanism 10. Thus each character 14 on the document 12 is scanned both orthogonally and successively by a plurality of scan lines 23 (the succession of elements 22 in a vertical direction) commencing at the right and ending at the left of the character. It is, of course, apparent that the scanning could commence at the left and end at the right of a character. However, in reading numeric characters, the least significant digit is scanned first which permits ease of adding numeric characters in an output computer.

The vertical scanning and the movement of the character effectively form a scan line raster 25. Although not shown in FIGURE 2, the scan line raster 25 is slightly skewed due to the movement of the transport mechanism 10. The scanning cycle of the pickup device 16 comprises a relatively slow vertical trace scan starting from an initial position 26 above the character being scanned and ending at a terminal position 28 below the character. The trace scan is followed by a rapid retrace back to the initial position 26. The electro-optical pickup device 16 is blanked by periodically recurring blanking pulses during the retrace interval so that no character image signals are produced during this interval.

In one embodiment of a character reader constructed in accordance with the invention, the length of a vertical trace scan line from the initial 26 to the final 28 positions comprises thirty-four elements 22. The time it takes to traverse one of the elements 22 is 1.1 microseconds. Thus, for purposes of explanation throughout the specification, the elements 22 will be utilized to measure time as well as length and area.

The character in FIGURE 2 represents a perfectly formed or nominal character and is dimensioned in the printer to be 14 elements or 14 rows high in the raster 25. Thus with a trace scan thirty-four elements high, the character is over-scanned approximately two and one half times. With such an overscan, a succession of characters being read may be appreciably misaligned but will still be scanned. The perfectly formed or nominal character is also dimensioned in the printer to be ten elements wide. However, it is to be noted that an appreciable number of the characters printed by a high-speed printer vary widely from the dimensions of a nominal character.

In scanning the dark numeral 2 on a light document, the scanning cycle for the scan line 1 of FIGURE 2 produces a video output signal during the trace interval which includes substantially a white or no output level for 8 elements, a pulse output for 8 elements, another white level for 4 elements, a pulse output for 2 elements, and finally a white level continuing for 12 elements. This portion of the video signal is a feature signal portion denoting a vertical stroke. The feature signal portion is followed by a blanking pulse having a duration of approximately 6.6 microseconds. It is to be noted that the character may lie anyplace within the raster 25 and thus the feature signal pulses in the video signal may begin at any random row in the raster 25 depending on the height of the character and its alignment. Different features in the characters produce different pulses in the video signal which, when synthesized, distinguish one character from another. The peak amplitude of the blanking pulses in the video signal is substantially constant and represents full black level. The pulses in the feature portion of the video signal vary in amplitude and increase in the direction of the black level depending on the contrast between the dark characters and the light document 12.

CHARACTER FONT

Figures 3, 5:
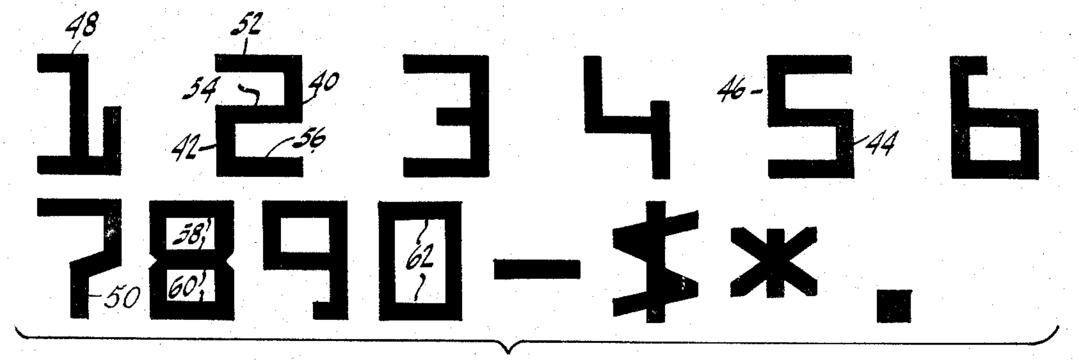
FIGURE 3 is one font of characters which may be utilized in the character reading system of FIGURE 2.
FIGURE 5 is a complete truth table that distinguishes one character from another in the font illustrated in FIGURE 3.

In FIGURE 3 there is illustrated a stylized font which may be utilized by a high-speed printer of, for example, the drum type in printing a document to be read by a character reader embodying the invention. A plurality of numerals from 0 to 9 are illustrated, as well as punctuation marks and other symbols. The operation of the character reader is described in the specification in terms of this font. However, it is to be clearly understood that the principles of the invention also apply to alphabetic as well as numeric characters.

The stylized font in FIGURE 3 emphasizes certain features of the characters to make recognition of even severely distorted characters reliable and accurate. The characters in FIGURE 3 are all illustrated as nominal or perfectly formed characters to clearly show the major and minor features which distinguish one character from another. The major features which are utilized by the character recognition system to distinguish one character from another are the vertical strokes that appear in all of the numerals and some of the symbols. These strokes are classified into upper and lower left and right strokes; as well as medium and long center strokes. The numeral 2 includes an upper right stroke (URS) 40 and a lower left stroke (LLS) 42. The numeral 5 includes a lower right stroke (LRS) 44 and an upper left stroke (ULS) 46. The numeral 1 includes a long center stroke (LCS) 48 while the numeral 7 includes a medium center stroke (MCS) 50.

The minor features which aid in distinguishing one character from another are the number of horizontal strokes or black crossings (BC) that occur in a character. Thus the numeral 2 includes three horizontal strokes or three black crossings 52, 54, and 56 in the center zone of the character. Additionally, the spacing between the horizontal strokes, or the length of the white gap therebetween, is another minor feature utilized in differentiating the characters. The numeral 8 includes two short white gaps (SWG) 58 and 60 while the numeral 0 includes one long white gap (LWG) 62. The remaining minor features, which are the height and width of the characters, are utilized primarily to recognize non-numeric characters.

FEATURE ZONES

It is apparent that some of the above major and minor features occur only in particular portions or zones of a character. Therefore the characters are automatically divided into zones. This is more clearly illustrated in FIGURE 4. Thus in zones 1 and 3, the right and left or first and last zones of a character, the features which distinguish one character from another are the presence and absence of upper and lower vertical strokes. Consequently in zones 1 and 3 the detection of vertical strokes is important as well as their relative positioning in one character.

In the center portion of the characters, or zone 2, the presence and absence of long and medium vertical center (LCS and MCS) strokes help to distinguish one character from another. Additionally in zone 2, the number of horizontal strokes or black crossings (BC) help to distinguish one character from another. Altogether there are three possible counts of horizontal strokes, or black crossings (BC), i.e., 1 in the dash symbol —, two in the 0, and three in the 2, etc. Thus the horizontal strokes are not relied upon as a stroke feature in distinguishing one character from another. This is because high-speed printers of the drum type tend to omit the horizontal strokes that occur in either the upper or lower portions of a character, such as either the bars 52 or 56 in the numeral 2 in FIGURE 3.

In the center zone, the white gaps between the horizontal strokes occurring in many characters are also detected. Substantially the only difference between a 0 and an 8 in the font of FIGURE 3 is the absence of a horizontal stroke in the 0. Since, as previously mentioned, a common distortion in high-speed printers is the omission of an upper or lower horizontal stroke, merely counting the number of black crossings in characters is not sufficiently reliable. For example, a numeral 8 would be indistinguishable from a numeral 0, if the 8 was distorted due to the omission of an upper or lower horizontal stroke. Measuring the length of the white gaps between horizontal strokes makes recognition more reliable.

A height feature, which is measured after the complete scanning of a character, is one of two features utilized to recognize the non-numeric information in FIGURE 3. There are three height classifications utilized. All of the numeric characters and the dollar sign $ are full characters or classified as height ($H_3$), the asterisk * is a half character or height ($H_2$), while the dash and period are classified as height ($H_1$).

The second feature required for the recognition of non-numeric characters is the width of the characters. The width is essentially the only feature that distinguishes the dash from the period in the font of FIGURE 3. To determine the width, the presence of feature signals in zone 3 ($VZ_3$) is detected. The absence of such a signal denotes a period rather than a dash.

The above features are those utilized to recognize characters in one embodiment of the invention. In FIGURE 5, a complete truth table is shown which illustrates how the characters in FIGURE 3 are distinguished from each other. The plus sign (+) indicates that a particular feature is present in a character while the minus sign (—) indicates that a particular feature is absent from the character. It is of course not required, as will be shown subsequently, that all of these features be detected for each character.

It will be appreciated that the division of a character being read into zones is an important procedure in reading characters that vary in overall width or stroke width. This is because it is necessary to know from which portion or zone of a character the feature signal information in the video signal is being derived so that it will be stored in the correct storage medium. As mentioned previously, some major features upon which recognition of a character is based, such as the right and left vertical strokes, are derived from zones 1 and 3 of a character respectively whereas many of the other features are detected only in the center zone 2 thereof. If all characters were printed with the same width, zoning would be no problem since the number of scan lines in the same zone of different characters would be constant. Consequently the transitions from one zone to another could be based on a counting of the scan lines. However the characters printed from high-speed computer printers frequently vary appreciably in width. Thus the number of scan lines for a particular zone in two different characters may differ. Therefore the system of present invention is also arranged to classify a character being read into one of three categories, weak, nominal, and strong, depending on the width of the vertical stroke scanned in zone 1.

CHARACTER CLASSIFICATION

In FIGURE 6 is shown a plurality of characters illustrating the categories into which a character is classified. Three printings of the numeral 7 are shown to delineate the relative appearance of the characters classified into the three categories. All of the characters may, for example, be printed from a high-speed printer of the drum type.

The topmost numeral 7 (FIGURE 6*a*) is classified as a weak character, the middle 7 (FIGURE 6*b*) is a nominal character, while the bottom-most 7 (FIGURE 6*c*) is a strong character. This classification is based solely on the number of scans in which a vertical stroke is detected in the right-hand portion of the character or zone 1.

A weak character has fewer than two scans which detect a vertical stroke in zone 1, a nominal character has two, and a strong character has more than two counted in this zone.

ASYNCHRONOUS ZONING

It is to be noted that the center stroke of the numeral 7 in FIGURE 6*a* occurs approximately the same distance from the start of each character as the left stroke of the numeral 0 in FIGURE 6*d*. This ambiguity could result in an incorrect recognition. To avoid such ambiguities, an asynchronous method of zoning is utilized which is based on the classification of the characters. The asynchronous method of zoning utilizes the detection of transitions from and to vertical strokes (stroke transitions in the feature signals) to switch the feature signals to the particular feature detectors and storage mediums for the various zones. By zoning is meant the effective division of a character into a predetermined number of zones. In the character reader embodying the invention, each character is scanned by a plurality of scanlines and zoning is accomplished by grouping together the video signals derived from successive combinations of scanlines. Asynchronous means that a dimension (e.g. width) of the zones varies. Thus, in asynchronous zoning, the number of scans for each zone varies, depending on the classification of the character. In summation, asynchronous zoning is defined as the effective division of each character into a predetermined number of zones, with the zones having a dimension that varies in size within the character dependent upon the classification of the character. Additionally, as an accuracy control measure, a form of synchronous zoning is also utilized in that zone transition signals are also generated after a predetermined maximum number of scans in a zone regardless of the features detected in a zone.

In an embodiment of the invention to be described, the minimum number of scans occurring in zone 1 is two. The major feature signals derived from these scans are stored in the storage medium for zone 1. If any scan line other than the first does not detect a vertical stroke, the video signal is considered to be derived from zone 2, the center zone, and the various minor features of the character occurring in zone 2 are detected.

The maximum number of scans that can occur in zone 1 is four. If by the end of the fourth scan in zone 1, the absence of a vertical stroke has not been detected, then the video signal in the next scan is considered to be derived from zone 2 of a character and the video signal is applied to the feature detectors for zone 2. Thus in FIGURE 6*a*, the absence of a vertical stroke would be detected in the second scan line. The character would be classified as weak and the optical reader would be considered as scanning zone 2 of the character in the next scan thereof.

In FIGURE 6*b*, the absence of a vertical stroke would not be detected until the third scan. The character would be classified as nominal and the recognition system would be switched to zone 2 at the end of the third scan. Similarly in FIGURE 6*c*, the absence of a vertical stroke would not be detected until the fourth scan line. This character would be classified as strong. Once the character is classified, the zoning for the remainder of the character is established.

The greatest variation of a character dimension occurs in zone 2. A weak character such as FIGURE 6*a* may have a maximum of seven scans in zone 2, while a strong character may have as few as two. The table below lists the maximum and minimum number of scans that will switch the optical character reader from zone 2 to zone 3 for a drum printer and a 5 x 7 stylus printer, when an optical character reader is constructed as a separate model for each. Additionally the table lists the number of scans for a composite or inclusive model capable of reading accurately both types of print. Furthermore, Table 1 illustrates the maximum and minimum number of scans that are utilized to switch the optical character reader from zone 2 to zone 3 if character classification is not utilized in the reader. In character readers which do not utilize character classification, all characters are considered to be nominal so that no information for weak or strong characters is listed in Table 1.

TABLE 1

| | Weak Character | | Nominal Character | | Strong Character | |
|---|---|---|---|---|---|---|
| | Min. Scans | Max. Scans | Min. Scans | Max. Scans | Min. Scans | Max. Scans |
| Using Character Classification: | | | | | | |
| (1) Drum | 5 | 7 | 4 | 6 | 3 | 5 |
| (2) 5 x 7 Stylus | 3 | 5 | 2 | 4 | 2 | 4 |
| (3) Inclusive (both drum and stylus) | 4 | 5 | 3 | 4 | 2 | 3 |
| Not Using Character Classification: | | | | | | |
| (4) Drum | ----- | ----- | 4 | 6 | ----- | ----- |
| (5) 5 x 7 Stylus | ----- | ----- | 2 | 4 | ----- | ----- |
| (6) Inclusive (both drum and Stylus) | ----- | ----- | 3 | 4 | ----- | ----- |

The optical character reading recognition system to be described is the type utilizing character classification and capable of reading both drum and stylus printers accurately. Thus the zone 2 to zone 3 transition signals occur with the number of scans shown in line 3 of Table 1.

The maximum number of scans that can occur in zone 3 in the character reader to be described is four. The minimum number is dependent on either the absence of feature signals in the video signal in zone 3 or the detection of a vertical stroke in this zone, as will be described in more detail subsequently.

ABBREVIATIONS

In order to facilitate the description of the detailed system the following abbreviations are used:

ERP, End Reset Pulse
ESTP, End of Scan Timing Pulse
LVS, Long Vertical Stroke
MVS, Medium Vertical Stroke
LCS, Long Center Stroke
MCS, Medium Center Stroke
ULS, Upper Left Stroke
URS, Upper Right Stroke
LLS, Lower Left Stroke
LRS, Lower Right Stroke
BC, Block Crossing
LWG, Long White Gap
SWG, Short White Gap
H, Height
$Z_{1-2}$, Zone 1 to zone 2 transition Pulse
$Z_{2-3}$, Zone 2 to zone 3 transition Pulse
$VZ_3$, Video in Zone 3

DETAIL DESCRIPTION OF READER

Referring now to FIGURE 7, a character reader system in accordance with the invention is illustrated. The system includes preliminary processing stages that determine which type of pulses in the video signal will be processed in the character reader system.

*Preliminary processing*

The preliminary processing stages (FIGURE 7*a*) include an AND gate 100 which separates the blanking pulses from the feature signal portions of the video signal. The video signal and a train of sampling pulses, which pulses are derived from a pulse generator and synchronizing circuit 102, are applied simultaneously to the AND gate 100. The sampling pulses are formed so as to activate the AND gate 100 only when the feature signal portions of the video signal are being applied thereto. Thus the blanking pulses are separated from the feature signal portions of the video signal.

The feature signal output of the AND gate 100 is applied to a pulse width discriminator 120. The pulse width discriminator 120 removes any pulses in the feature signals which have a pulse width less than a predetermined minimum width, such as for example 750 nanoseconds. Such narrow pulses may, for example, occur in the feature signals due to smudges on the document being read, or due to black spots created by the raised intersections of the cross-webbing in the inked ribbon o fthe printer when the ribbon strikes the document. The pulse width discriminator 120 includes a delay circuit 122 which may, for example, exhibit the previously mentioned predetermined delay of 750 nanoseconds. The feature signals from the AND gate 100 are coupled directly to one input of an AND gate 124 as well as through the delay circuit 122 to the other input of the AND gate 124. Thus the AND gate 124 is activated only when the pulses in the feature signal exceed at least 750 nanoseconds so that the delayed and directly applied pulses appear concurrently at the inputs to the gate 124. The signals passed by the AND gate 124 are applied to one input of an OR gate 126. The output of the OR gate 126 is, in turn, fed back through a feedback circuit 128 to the other input thereof. The feedback circuit 128 functions to stretch the width of all the pulses in the character image signal up to a predetermined minimum width of, for example, 1.1 microseconds.

This predetermined width of 1.1 microseconds is selected so that it coincides with one element 22 in the raster 25 of FIGURE 2.

*Preliminary storage circuit*

Figure 7A:
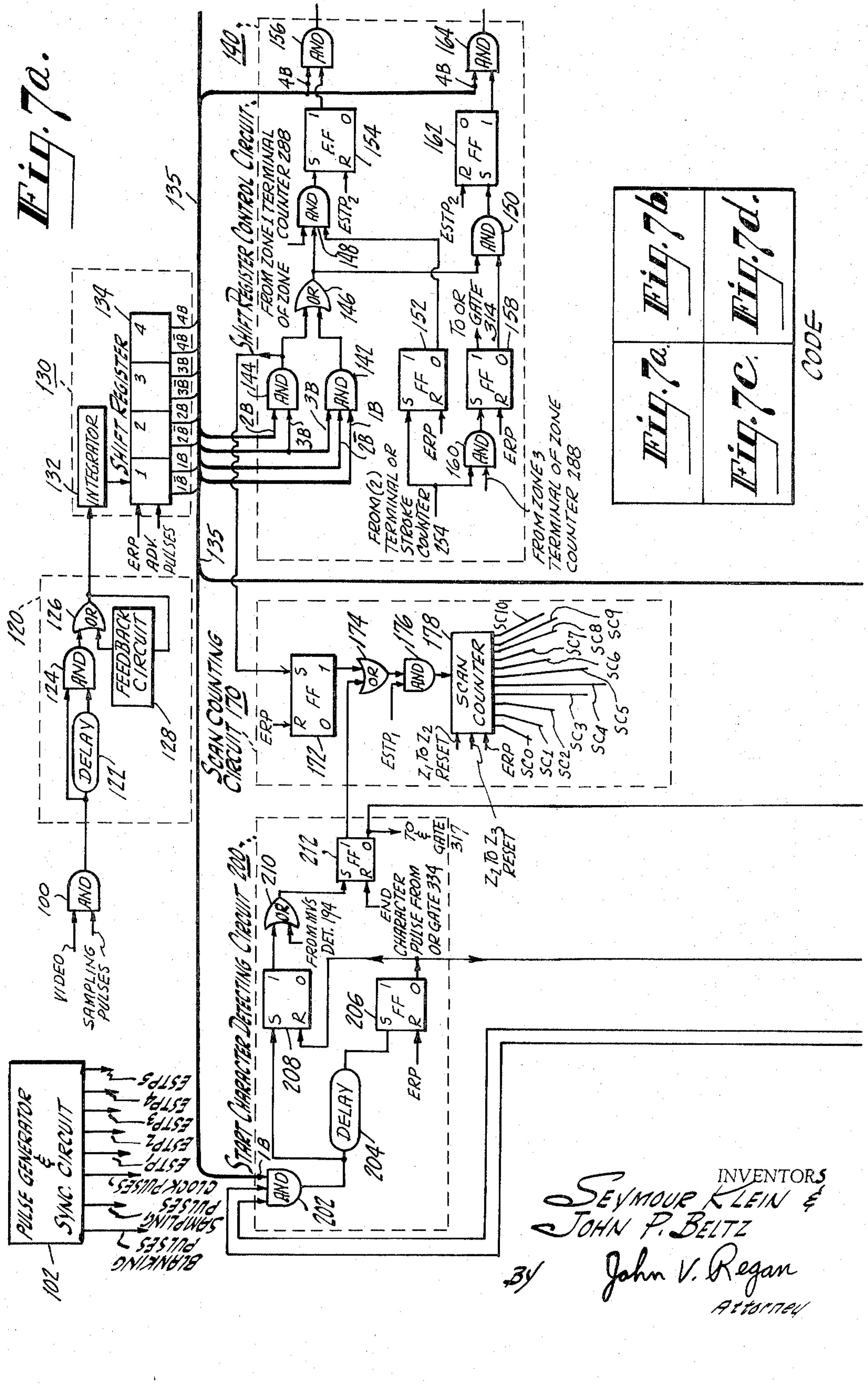

The feature signals from the pulse width discriminator 120 are applied to a preliminary storage circuit 130 (FIG. 7*a*). The preliminary storage circuit 130 functions to translate the feature signals to digital coded signals. The preliminary storage circuit 130 includes an integrator 132 and a four-stage shift register 134. The pulses in the feature signals have to charge the integrator 132 up to a predetermined minimum level of amplitude before the signals are advanced into the first stage of the shift register 134 by the application of a train of advance pulses to the register 134. Thus signals are advanced into the register 134 only when the application of the advance pulses coincides with a minimum amplitude signal level in the integrator 132. Thus the preliminary storing of the signals and their advancement through the shift register 134 stages into the remaining portions of the character recognition system is fixed in time or digitalized by the advance pulses. The origin of the advance pulses will be described subsequently.

The shift register 134, may, for example, comprise a plurality of flip-flop circuits. Each flip-flop circuit or stage of the register 134 exhibits an output of one level when an element of the feature signal information is stored therein and an output of another level when no element is stored therein. For convenience in explanation, a stored element will be referred to as a black element and denoted by the symbol B in FIGURE 7. Additionally the absence of a feature signal element will be referred to as a white element and denoted by the symbol $\overline{B}$ in FIGURE 7. The B signals are taken from one output side of the flip-flop, and the $\overline{B}$ signals are taken from the other output side of the flip-flop. The signals are applied through a bus 135 to other circuits in the recognition system. For convenience the individual connections from the bus line 135 to the other circuits are denoted 1B, 2B, 3B, or 4B when derived from the said one output sides of the corresponding flip-flop stages in the shift register 134 and denoted $1\overline{B}$, $2\overline{B}$, $3\overline{B}$, or $4\overline{B}$ when derived from the said other output sides.

Figure 7B:
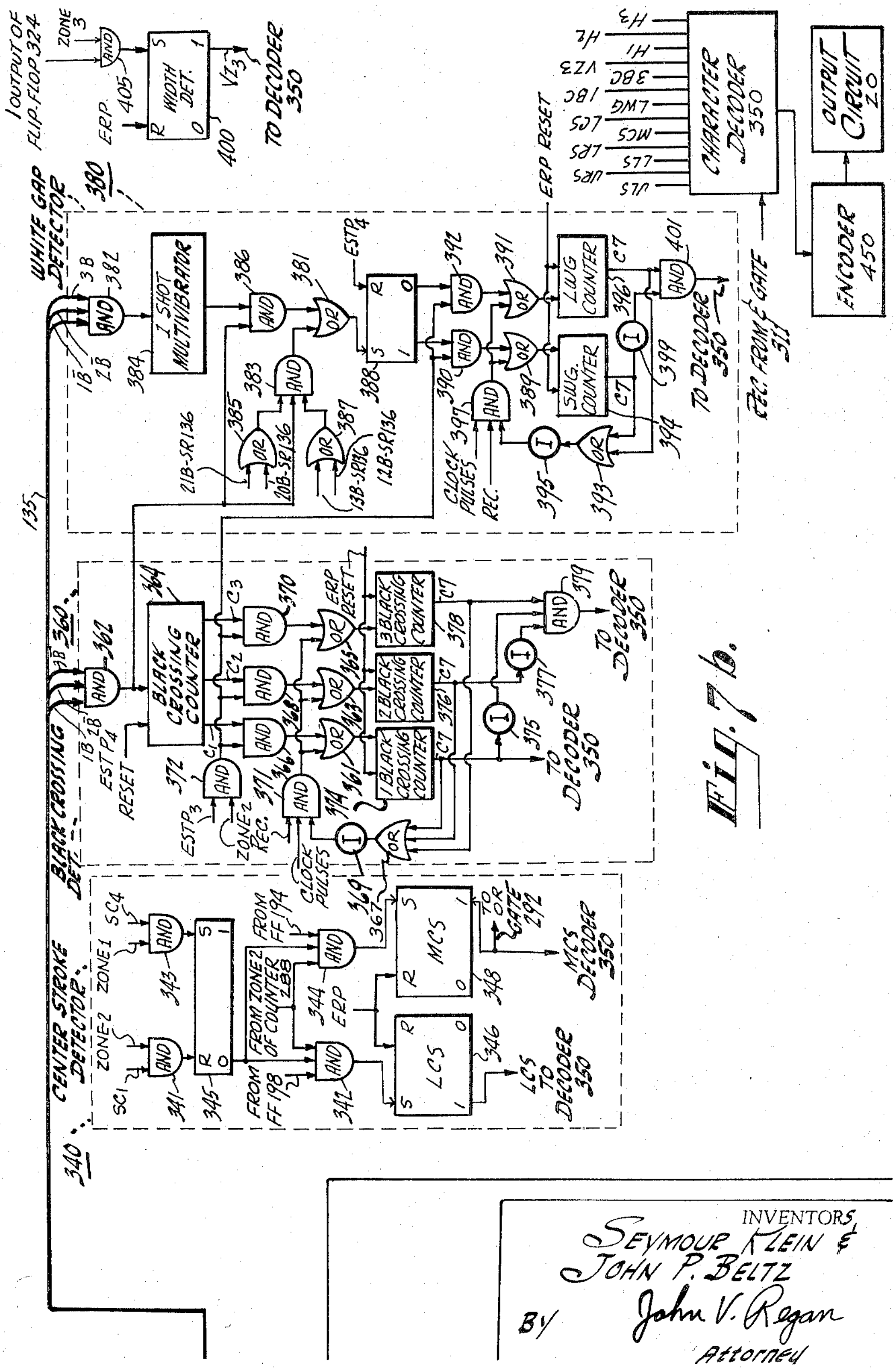
Figure 7C:
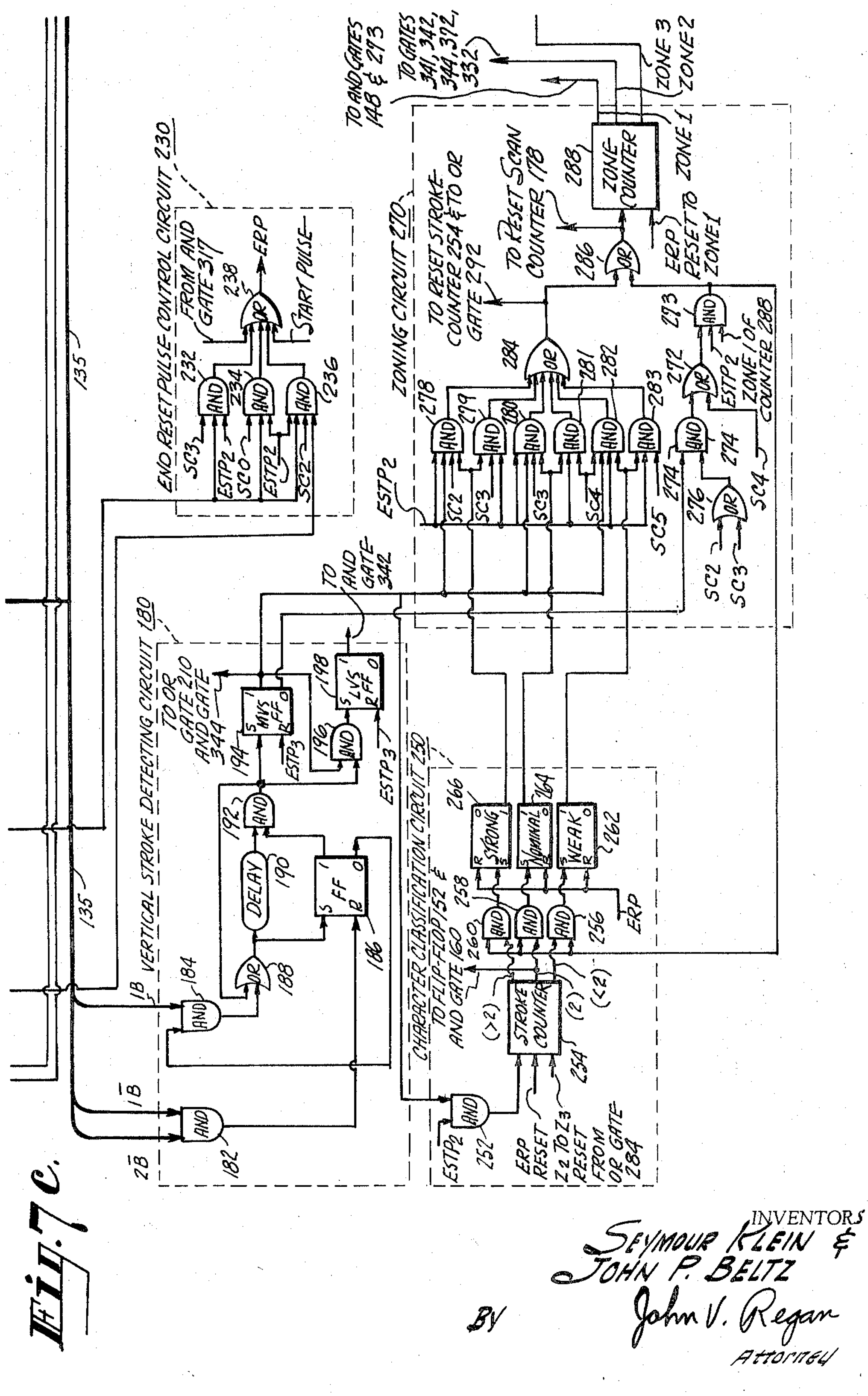
Figure 7D:
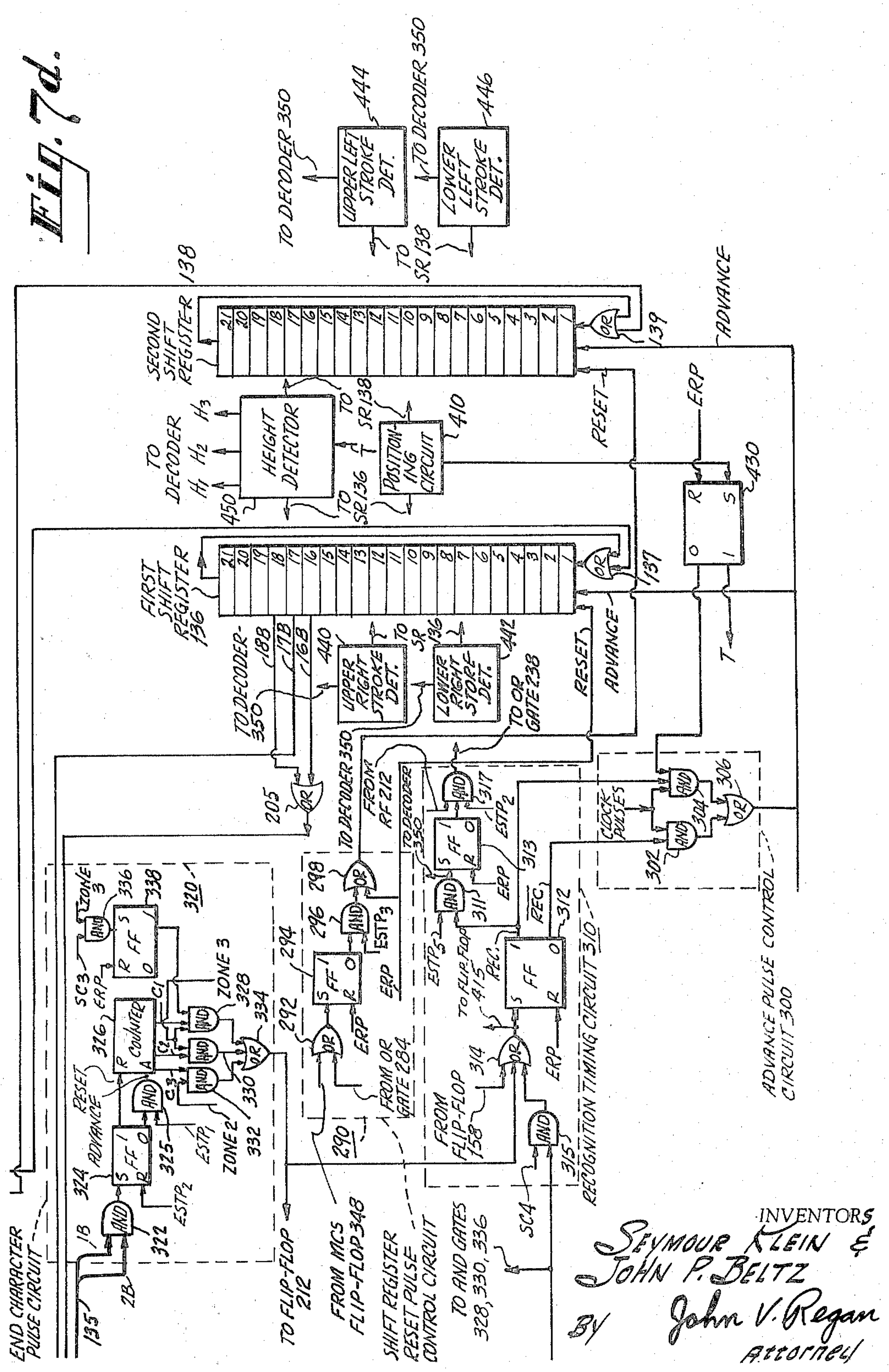

The signals passing the initial criteria in the discriminator 120 are stored temporarily in the shift register 134 and then subjected to further criteria before application to first and second shift registers 136 and 138 (FIG. 7*d*). The shift registers 136 and 138 comprise the storage mediums for the vertical stroke feature signals detected when scanning a character. The shift registers 136 and 138 may each, for example, include twenty-one flip-flop stages. A similar notation to that used for the shift register 134 will be used to denote the presence and absence of stored feature signal elements. The registers 136 and 138 will be described in more detail subsequently.

*Shift register control circuit*

The feature signals preliminarily stored in the shift register 134 are first applied to a shift register control circuit 140 (FIGURE 7*a*). The circuit 140 includes an input AND gate 142, two input terminals of which are coupled to the B signal output terminals of the first and third stages of the shift register 134 while the remaining input terminal is coupled to the $\overline{B}$ signal output terminal of the second stage of the register 134. A second input AND gate 144 is also coupled to the B signal output terminals of the second and third stages of the shift register 134. The AND gate 144 is activated only when black elements (B) are simultaneously stored in the second and third stages of the shift register 134. The AND gate 142 is activated only when black elements are stored in the first and third stages of the register 134 while a white element ($\overline{B}$) is stored in the second stage thereof. Thus initially, the AND gates 142 and 144 prevent feature signal information which contains only a black element (B) followed by two white elements ($\overline{B}$) from being stored in the shift registers 136 and 138.

The AND gates 142 and 144 are coupled through an OR gate 146, to another pair of AND gates 148 and 150. The AND gate 148 controls the flow of information into the first shift register 136 (FIGURE 7*d*). The AND gate 148 is activated only when, (1) a control flip-flop 152 is in the reset condition, (2) a signal level from the zone 1 output terminal of a zone counter 288 in a zoning circuit 270 (FIGURE 7*c*) to be described subsequently, indicates that zone 1 of a character is being scanned, and (3) the OR gate 146 is activated. Thus it is apparent that the first shift register 136 (FIGURE 7*d*) only stores information derived from zone 1 of a character being scanned. The control flip-flop 152 is reset by an ERP pulse, the origin of which will be described subsequently. Furthermore, the flip-flop 152 is set, thereby blocking the AND gate 148, when a signal derived from the count of 2 output terminal of a stroke counter 254 in a character classifier circuit 250 (FIGURE 7*b*) to be described subsequently, counts two successive strokes in two successive scans of a character. Thus feature signals from no more than two successive scans of a vertical stroke are stored in the first shift register 136 (FIGURE 7*d*).

The output of the AND gate 148 is coupled to the set input terminal of a flip-flop 154, the "1" output terminal of which is coupled to an input of an AND gate 156. The flip-flop 154 is reset at the end of every scan by an end of scan timing pulse ($ESTP_2$) derived from the pulse generator 102. The $ESTP_2$ pulse is the second of the end of scan timing pulses derived from the pulse generator 102 at the end of every scan. The leading edge of an $ESTP_2$ pulse is delayed in time 1.1 microseconds with respect to the leading edge of an $ESTP_1$ pulse, while the leading edge of an $ESTP_3$ pulse is delayed 1.1 microseconds with respect to the leading edge of an $ESTP_2$ pulse etc. The other input of the AND gate 156 is derived from the B output terminal of the fourth stage of the shift register 134. The AND gate 156 is coupled to the input of an OR gate 137 (FIGURE 7*d*) which in turn is coupled to the first stage of the first shift register 136.

The AND gate 150 (FIGURE 7*a*) controls the flow of information into the second shift register 138 (FIGURE 7*d*). The gate 150 is enabled at one input when a flip-flop 158 is in the reset condition. The second input of the gate 150 is derived from the output of OR gate 146. The flip-flop 158 is reset by an ERP pulse. The flip-flop 158 is set to block the AND gate 150 when a control signal is derived from an AND gate 160. The input to the AND gate 160 is derived from the zone 3 terminal of the zone counter 288 (FIGURE 7c), and the count of 2 terminal of the stroke counter 254 (FIGURE 7c). Thus the flip-flop 158 (FIGURE 7a) is set to block the AND gate 150 to prevent the flow of information into the second shift register 138 (FIGURE 7d) after two successive scans in zone 3 of a character has detected vertical strokes.

The AND gate 150 (FIGURE 7a) is coupled to the set input terminal of a flip-flop 162, the "1" output terminal of which is coupled to one input terminal of an AND gate 164. The other input of the AND gate 164 is derived from the B signal terminal of the fourth stage of the shift register 134. The output of the AND gate 164 is coupled through an OR gate 139 (FIGURE 7d) which in turn is coupled to the first stage of the second shift register 138. The flip-flop 162 is reset by an $ESTP_2$ pulse.

*Scan counting circuit 170*

The shift register control circuit 140 is also coupled to a scan counting circuit 170 (FIGURE 7a) which counts the number of scans in each zone of a character being read. The output of the AND gate 144 in the shift register control circuit 140 is coupled to the set terminal of a flip-flop 172 in the scan counting circuit 170. Thus the flip-flop 172 is set only when black elements are present in the second and third stages of the shift register 134 and once set remains set until reset by an ERP pulse. The 1 output terminal of the flip-flop 172 is coupled through an OR gate 174 to an AND gate 176. The other input to the AND gate 176 is an $ESTP_1$ pulse. The gate 176 therefore produces a pulse output at the end of each scan after the flip-flop 172 has been set by at least two successive black elements in a scan line. The AND gate 176 is coupled to a scan counter 178 which counts the number of scans in each zone. The scan counter 178 may, for example, comprise a plurality of flip-flops serially connected and having parallel outputs, each successive one of which denotes a higher count. The outputs of the counter 178 are represented by the SC0 through SC10 terminals, each respectively indicating a count progressing from zero to ten. The scan counter is reset to a count of zero by an ERP pulse, as well as by pulses denoting a transition from zone 1 to zone 2 and a transition from zone 2 to zone 3, which pulses are derived from the OR gate 286 in the zoning circuit 270 (FIGURE 7c), as will be described subsequently.

*Start character detecting circuit*

A start character detecting circuit 200 (FIGURE 7a) is provided to detect the fact that a character is being scanned. This circuit requires two or three scans of a character before detecting the start thereof. The information may be redundant since a stroke detecting circuit 180 (FIGURE 7c) may already have detected a vertical stroke in one scan of a character. The start character detecting circuit 200 is utilized for the non-numeric characters in the font of FIGURE 3.

The start character detecting circuit 200 includes an input AND gate 202, one of the input terminals of which is coupled to the B signal terminal of the first stage of the shift register 134 in the preliminary storage circuit 130. Another of the input terminals of the AND gate 202 is coupled directly to the seventeenth stage of the first shift register 136 (FIGURE 7d) while the remaining input terminal is coupled to the output terminal of an OR gate 205 (FIGURE 7d). The input terminals of the OR gate 205 are coupled to the sixteenth and eighteenth stages of the first shift register 136. The output of the AND gate 202 (FIGURE 7a) is coupled through a delay circuit 204 to the set terminal of a flip-flop 206 and is coupled directly to the set terminal of a flip-flop 208. The flip-flop 206, which is reset by an ERP pulse, has its "0" output terminal coupled to the reset terminal of the flip-flop 208 to hold the flip-flop 208 in the reset condition until the flip-flop 206 is set. The "1" output terminal of the flip-flop 208 is coupled through an OR gate 210 to the set terminal of an output flip-flop 212, the setting of which denotes that a character is being scanned. The other input terminal of the OR gate 210 is coupled to the "1" output terminal of a MVS detecting flip-flop 194 in the stroke detecting circuit 180 (FIGURE 7c). The flip-flop 212 is reset by an end character pulse, the origin and function of which will be described subsequently.

The start character detector circuit 200 detects the arrival of a non-numeric character in the scanning area. However, the start character detecting circuit 200 does not detect the start of a character until at least the second scan thereof. The reason for preventing the setting of the output flip-flop 212 is to avoid the error of detecting a smudge on a document and interpreting it as a character.

Figure 8:
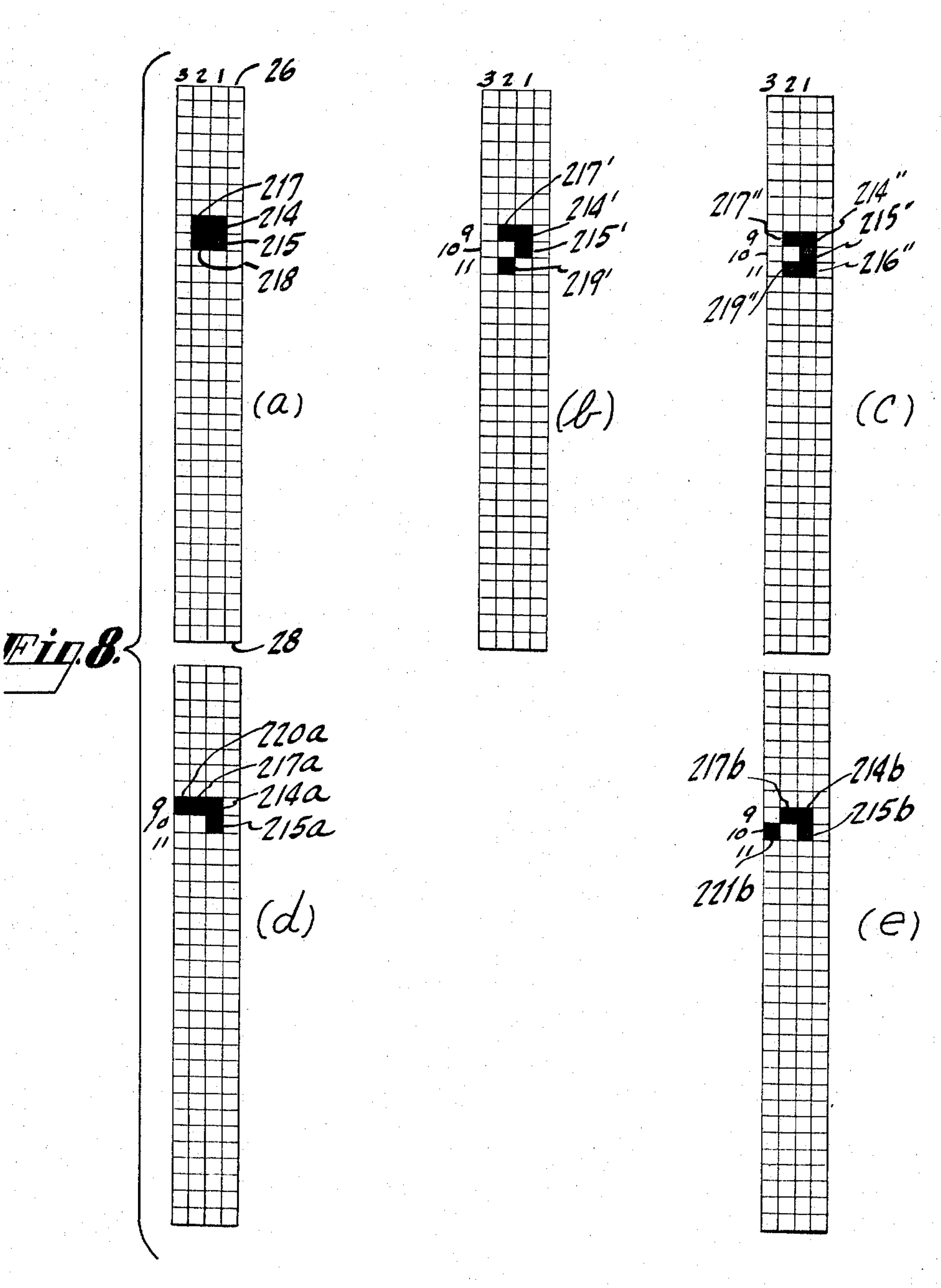

FIGURES 8a through 8e diagrammatically illustrate the type of impressions or black elements on a document that will and will not cause the start character detector 200 to detect the start of a character being scanned by the electro-optical pickup device 16. In the first and second scan lines of the raster shown in FIGURE 8a, pairs of successive black elements 214 and 215, and 217 and 218 appear respectively. This type of impression will not cause the start character detecting circuit 200 to detect the start of a character since it could merely be a smudge on the document. Assuming that the black elements 214 and 217 appear at the ninth row in the raster of FIGURE 8a and the elements 215 and 218 appear in the tenth row thereof, the first scan line will advance the black element 214 into the first stage of the shift register 134 (FIGURE 7a) after first scanning eight white elements. Two advance pulse times later the black 215 is advanced into the second stage of the shift register 134 while the element 214 is advanced to the third stage of the shift register 134. The AND gate 144 in the shift register control circuit 140 is activated and the flip-flop 154 is set, thereby enabling the AND gate 156. The AND gate 156 will be activated when the black element 214 is advanced into the fourth stage of the shift register 134. At the time the pickup device 16 has scanned the thirteenth row in the first scan line of the raster in FIGURE 8a, the black element 214 is advanced into the first stage of the first shift register 136 (FIGURE 7d). The black element 214 will be advanced from the first stage of the first shift register 136 to the twenty-first stage of this register (while the element 215 is advanced to the twentieth stage) by the time the pickup device 16 scans the thirty-third row of the raster. The advance pulse occurring at the thirty-fourth row of the raster causes the black element 214 to be fed back from the twenty-first stage of the initial shift register 136 through the OR gate 137 to the first stage of the same register. When the pickup device 16 reaches its terminal position 28, it is returned to the initial position 26. However, during the retrace interval eight advance pulses occur and consequently, at the beginning of the second scan line, the black elements 214 and 215 are located in the ninth and eighth stages respectively of the first shift register 136. In the second scan line, the pickup device 16 traverses eight elements before detecting black element 217 (FIGURE 8a). Consequently, the black elements 214 and 215 will have advanced to the seventeenth and sixteenth stages respectively of the first shift register 136 (FIGURE 7d) by the time the black element 217 arrives at the first stage of the shift register 134 (FIGURE 7a). Consequently, the AND gate 202 in the start character detector 200 will be enabled by the inputs from the sixteenth and seventeenth stages of the first shift register and the input from the first stage of the shift register 134. The output of the AND gate 202 is applied to the set terminal of the flip-flop 208. However the flip-flop 206 will not be switched to the set condition thereof inasmuch as the reset condition of the flip-flop 206 holds the flip-flop 208 in the reset condition. The output of the AND gate 202 is also applied to the delay circuit 204, which introduces a delay on the order of 1.5 microseconds or slightly more than one raster element 22. Thus the parallel occurrence of the black elements 214 and 217 in the raster of FIGURE 8*a*, will not activate the start character detecting circuit 200.

The arrival of the black element 218 in the first stage of the shift register 134 finds the black elements 214 and 215 in the eighteenth and seventeenth stages respectively of the shift register 136. Consequently, a second pulse output is produced by the AND gate 202. However, this pulse also does not set the flip-flop 208 because the previous pulse still has not traversed the delay line 204 by this time. Thus the start character detector 200 will not detect the configuration of black elements shown in FIGURE 8*a* as the start of a character.

Similarly, the black elements appearing in FIGURE 8*b* will also not be detected as the start of a character. During the second scan line of the raster shown in FIGURE 8*b*, the black elements 214' and 217' cause an output pulse to be applied to the delay line 204 (FIGURE 7*a*) in a manner identical to the elements 214 and 217 in FIGURE 8*a*. At the next advance pulse, the AND gate 202 (FIGURE 7*a*) is disabled because a white element appears in the first stage of the shift register 134. Similarly, when the black element 219' is advanced into the first stage of the shift register 134 at the following advance pulse, the black elements 214' and 215' will have advanced to the nineteenth and eighteenth stages respectively of the first shift register 136 (FIGURE 7*d*). The absence of a black element stored in the seventeenth stage of the first shift register 136 prevents the AND gate 202 from being activated. Thus the type of black elements illustrated in FIGURE 8*b* will not be detected as the start of a character.

In FIGURE 8*c* is illustrated one configuration that will detected by the start character detecting circuit 200 as the start of a character. During the second scan line of the raster of FIGURE 8*c*, the black element 217'' will be advanced into the first stage of the shift register 134 coincidentally with the advancement of the elements 214'' and 215'' into the seventeenth and sixteenth stages respectively of the register 136. Thus the AND gate 202 is activated and a pulse is applied to the delay circuit 204. The delay circuit 204 applies the pulse to set the flip-flop 206 after a delay of over one element. This removes the reset hold signal applied from the flip-flop 206 to the flip-flop 208. When the black element 219'' is advanced into the first stage of the register 134, the black elements 214'', 215'' and 216'' are stored in the nineteenth, eighteenth and seventeenth stages respectively of the register 136. Thus the AND gate 202 is again activated and the output thereof sets the flip-flop 208 which in turn sets the flip-flop 212. The "1" output terminal of the flip-flop 212 is coupled to the OR gate 174 in the scan counting circuit 170.

In FIGURES 8*d* and 8*e* are shown configurations that will also be detected by the start character detector circuit 200 as the start of a character. In the second scan line of the raster of FIGURE 2*d*, the black element **217*a* will be advanced into the first stage of the shift register 134 coincidentally with the advancement of tthe elements 214*a* and 215*a* into the seventeenth and sixteenth stages respectively of the register 136. The AND gate 202 is activated and a pulse is applied to the delay circuit 204. The delay circuit 204 applies the pulse to set the flip-flop 206 after a delay of over one element. This removes the reset hold from the flip-flop 208**.

In the third scan line of FIGURE 8*d*, the black element **220*a* in the first stage of the shift register 134 causes the AND gate 202 to be activated since the elements 214*a* and 217*a* will be stored in the seventeenth stage of the shift register 136 while the element 215*a* will be stored in the sixteenth stage thereof. The AND gate 202 is activated and the flip-flop 208 is set. The setting of the flip-flop 208 sets the output flip-flop 212**.

The configuration of FIGURE 8*e* sets the output flip-flop 212 of the start character detector circuit 200 in a manner similar to that of FIGURE 8*d*. However in the third scan line of FIGURE 8*e* the black elements **214*b* and 215*b* will be stored in the eighteenth and seventeenth stages of the shift register 136 when the black element 221*b* is stored in the first stage of the shift register 134**. Otherwise the operation is the same as previously described.

The detection of the start of a character by the detecting circuit 200 may be redundant since the stroke detector circuit 180 may detect a stroke on the first scan of a character and have previously set the flip-flop 212 through the OR gate 210.

*End reset pulse control circuit*

The start character detector 200 inhibits the creation of an end reset pulse (ERP) in the control circuit 230 therefor (FIGURE 7*c*). The ERP control circuit 230 includes AND gates 232, 234 and 236. An $ESTP_2$ pulse from the pulse generator 102 is applied as one input to all of the AND gates. The second input to all the gates 232, 234 and 236 is derived from the "0" output terminal of the output flip-flop 212 in the start character detector 200 (FIGURE 7*a*). The third inputs to the AND gates 232, 234 and 236 are derived respectively from the scan count of three (SC3), zero (SC0), and two (SC2) terminals of the scan counter 178 (FIGURE 7*a*). Lastly, the fourth input to the AND gate 236 is derived from the "0" output terminal of the flip-flop 206 in the start character detector 200 (FIGURE 7*a*). The outputs of the AND gates 232, 234 and 236 are coupled to the input terminals of an OR gate 238 from which an ERP pulse is derived.

The AND gate 234 causes an ERP pulse to be derived from the OR gate 238 at the end of a scan in which the scan counter 178 has not counted a first scan and the flip-flop 212 in the start character detector 200 (FIGURE 7*a*) has not been set. It will be recalled that the scan counter 178 counts any scan which contains two successive black elements. When the scan counter 178 counts a first scan, the AND gate 234 is blocked.

The AND gate 236 causes an ERP pulse to be derived from the OR gate 238 at a scan count of two in the scan counter when neither the flip-flop 206 nor the flip-flop 212 in the start character detector 200 has been set. It will be recalled that the flip-flop 206 is set when a configuration such as that shown by the elements 214', 215' and 217' in FIGURE 8*b* occurs.

The AND gate 232 causes an ERP pulse to be derived from the OR gate 238 at a scan count of three in the scan counter 178 where the flip-flop 212 has not been set. Once the flip-flop 212 in the start character detector 200 has been set all the AND gates 232, 234 and 236 are blocked until an end character pulse, to be described subsequently, resets the flip-flop 212.

The ERP pulse which is derived from the circuit 230 resets the various registers, counters and flip-flops in the character recognition system to their initial operating condition. Additionally, a start pulse, which is generated when the power supply (not shown) for the character recognition system is energized, is also applied to an input terminal of the OR gate 236 in the ERP control circuit 230. Thus when the optical character reader is initially energized the start pulse produces an ERP pulse to reset the various components in the system. Any other suitable means can be used to establish the various elements in an initial state as by using a general reset pulse, for example.

*Vertical stroke detector circuit 180*

A vertical stroke detector circuit 180 is included in the recognition system (FIGURE 7*c*) to detect vertical strokes that occur in any zone of a character being scanned as well as to indicate the start of a character if a stroke occur in zone 1. The stroke detector 180 includes a pair of input AND gates 182 and 184. The AND gate 182 has first and second inputs derived from the B signal output terminals of the first and second stages of the shift register 134 (FIGURE 7*a*) and is activated only when signals representing a pair of white elements ($\overline{B}$) appear in these stages. The output of the AND gate 182 is coupled to the reset terminal of a flip-flop 186. The "0" output terminal of the flip-flop 186 is coupled to one input terminal of the AND gate 184 while the other input terminal of the gate 184 is coupled directly to the B signal output terminal of the first stage of the shift register 134 (FIGURE 7*a*). The AND gate 184 (FIGURE 7*c*) is therefore activated when a black element appears in the first stage of shift register 134 and the flip-flop 186 is in the reset condition. The output of the AND gate 184 is coupled through an OR gate 188 to a delay circuit 190 and to the set terminal of the flip-flop 186. The delay circuit 190 comprises a plurality of delay stages (not shown) each of which is blocked when the flip-flop 186 is reset. The delay circuit 190 is constructed to introduce a time delay of at least five elements or 5.5 microseconds to an input pulse applied thereto. Both the output of the delay circuit 190 and the "1" terminal of the flip-flop 186 are coupled to an AND gate 192. The output of the AND gate 192 is coupled to the set terminal of flip-flop 195, which functions as a detector of medium vertical strokes (MVS).

The stroke detecting circuit 180 detects a stroke in any scan of any zone in a chaarcter being read. The over-scanning of a character causes the AND gate 182 to be activated by any two successive white elements ($\overline{B}$) stored in the first two stages of the shift register 134. The activating of the AND gate 182 resets the flip-flop 186 and enables the AND gate 184 for the first black element arriving in the first stage of the shift register from the first scan line of a character. The arrival of the first black element B in a scan activates the AND gate 184 and passes a pulse therethrough which sets the flip-flop 186. The flip-flop 186 in turn enables the AND gate 192. The pulse is also applied to the delay circuit 190 which introduces a five element delay. Thus if two successive white elements $\overline{B}$ are not detected during this delay time, the initial pulse passes through the AND gate 192 and sets the medium vertical stroke detector flip-flop 194. Thus a medium vertical stroke is effectively defined as one which is at least five elements high. It is apparent that the circuit detects a medium vertical stroke even if single white elements $\overline{B}$ occur during the time delay introduced by the delay circuit 190. This is because the flip-flop 186 is reset (thereby blocking the delay 190 and AND gate 192) only by two successive white elements $\overline{B}$.

The stroke detecting circuit 180 also detects long vertical strokes by feeding back the output of the AND gate 192 to the input of the delay circuit 190. The output of the AND gate 192 is also coupled to one input of an AND gate 196, the other input of which is derived from the "1" output terminal of the flip-flop 194. The AND gate 196 is in turn coupled to the set terminal of a flip-flop 198 which functions as a detector of long vertical strokes (LVS). The detection of a long vertical stroke is due to the fact that the AND gate 196 is activated only when the flip-flop 194 has been set by a medium vertical stroke and the feedback pulse passes through the delay circuit 190. Thus a long vertical stroke is effectively defined as one that is at least ten elements high and does not contain more than single white elements. Each of the stroke detecting flip-flops 194 and 198 are reset at the end of every scan by an $ESTP_3$ pulse so that they detect the presence or absence of vertical strokes in every scan of a character being read.

*Character classification circuit*

A character classification circuit 250 is included in the recognition system to classify a character into strong, weak or nominal categories, as described above in connection with FIGURE 6. It is to be recalled that this classification is based on the width, in terms of scan lines, of a vertical stroke occurring in zone 1 of a character. If there is no stroke in zone 1 of a character, as in the non-numeric characters in FIGURE 3, the character is classified as weak. The character classification 250 includes an AND gate 252, one input of which is derived from the "1" output terminal of the medium vertical stroke detecting flip-flop 194 in the vertical stroke detector 180 while the other input is an $ESTP_2$ pulse from the pulse generator 102 (FIGURE 7*a*). Thus the AND gate 252 produces an output pulse during each scan which detects a stroke. The AND gate 252 is coupled to a stroke counter 254 which counts each stroke detected. The counter 254 is also reset to zero by an ERP pulse, as well as by a zone 2 to zone 3 transition pulse (to be described subsequently).

The stroke counter 254 has three output terminals, one of which indicates a count of less than 2, (<2) the second indicates a count of 2, (2) and the third of which indicates a count of greater than 2 (>2). The stroke counter, for example, may be a three stage decimal counter in which the third stage output is used to inhibit the first stage input. Also a binary counter with suitable decoding can be used. The stroke counter outputs are applied respectively to the AND gates 256, 258 and 260. Also applied to the AND gates 256, 258 and 260 is a pulse derived from the zoning circuit 270 and denoting the transition in scanning from the first to the second zones of a character. The origin of this transition pulse will be described in more detail subsequently. The outputs of the AND gates 256, 258 and 260 are coupled respectively to the set terminals of the flip-flops 262, 264 and 266 which comprise respectively a weak, a nominal, and a strong character detector.

Thus, if the stroke counter 254 counts more than 2 vertical strokes before the pulse denoting the transition from zone 1 to zone 2 is applied to the AND gates 256, 258 and 260, the stroke counter 254 produces an output from the terminal (>2) and thereby sets the flip-flop 266, denoting that a strong character is being scanned. The flip-flops 262, 264 and 266 are all reset by an ERP pulse.

*Zoning circuit*

A zoning circuit 270 (FIGURE 7*c*) is provided to control the flow of feature signal information into the various storage and detecting devices in the character recognition system. The zoning circuit includes AND gate 273, the output of which denotes a transition from zone 1 to zone 2. One input to the AND gate 273 is derived from the zone 1 output terminal of a zone counter 288. The second input is from an OR gate 272 while the third input is an $ESTP_2$ pulse. One input of the OR gate 272 is derived from the count of 4 terminal (SC4) from the fourth stage of the scan counter 178 in the scan counting circuit 170 (FIGURE 7*a*). Thus the AND gate 273 will produce a zone 1 to 2 transition pulse at a scan count of 4 in zone 1 regardless of any other conditions in the circuit. Therefore a scan count of 4 is the maximum number of scans that can occur in zone 1 in the embodiment shown in FIGURE 7. The other input to the OR gate 272 is derived from an AND gate 274. One input to the AND gate 274 is derived from the "0" output terminal of the MVS detecting flip-flop 194. The symbol $\overline{MVS}$ denotes the absence of the detection of a medium vertical stroke in the flip-flop 194. The other input to the AND gate 274 is derived from an OR gate 276, the inputs of which in turn are derived from the count of 2 (SC2) and the count of 3 (SC3) terminals from the second and third stages of the scan counter 178. Thus it is apparent that the absence of a medium vertical stroke on either the second or third scan as counted by the scan counter 178 generates a pulse denoting the transition from zone 1 to zone 2. Thus in scanning the numeral 7 in FIGURE 6*a*, a transition pulse would be generated at the end of the second scan line while in scanning the numeral 7 in FIGURE 6*b*, a transition pulse would be generated at the end of the third scan line.

A circuit denoting the transition from zone 2 to zone 3 is also included in the zoning circuit 270. The zone 2 to 3 transition circuit includes a plurality of AND gates 278 through 283, each having an $ESTP_2$ pulse as one input and an output coupled to an OR gate 284. Input terminals of the AND gates 278 and 279 are also coupled to the "1" output terminal of the strong character detector flip-flop 266 as well as to the count of two (SC2) and count of three (SC3) terminals respectively of the scan counter 178. Additionally the AND gate 278 is also coupled to the "1" output terminal of the medium vertical stroke detector flip-flop 194. Thus the AND gate 278 produces a zone 2 to 3 transition pulse when a strong character is being scanned in zone 2 if a medium vertical stroke is detected at the second scan of this zone. Similarly the AND gate 279 produces a zone 2 to 3 transition pulse when a strong character is being scanned in zone 2 if at the time three scans are counted in this zone a medium vertical stroke has not been detected.

Input terminals of the AND gates 280 and 281 are also coupled to the "1" output terminal of the normal character detector flip-flop 264 as well as to the count of three (SC3) and count of four (SC4) terminals respectively of the scan counter 178. Additionally the AND gate 280 is also coupled to the "1" output terminal of the medium vertical stroke detector flip-flop 194. Thus the AND gate 280 produces a zone 2 to 3 transition pulse when a nominal character is being scanned in zone 2 if a medium vertical stroke is detected at a scan count of three in this zone. Similarly the AND gate 281 produces a transition pulse when a nominal character is being scanned in zone 2 if at the time four scans are counted, a medium vertical stroke has not been detected.

Input terminals of the AND gates 282 and 283 are also coupled to the "1" output terminal of the weak character detector flip-flop 262 as well as to the count of four (SC4) and count of five (SC5) terminals respectively of the scan counter 178. Similarly the AND gate 282 is also coupled to the "1" output terminal of the medium vertical stroke detector flip-flop 194. Thus the AND gate 282 produces a zone 2 to 3 transition pulse when a weak character is being scanned in zone 2 if a medium vertical stroke is detected at the fourth scan of this zone. Similarly the AND gate 283 produces a zone 2 to 3 transition pulse when a weak character is being scanned in zone 2 if a medium vertical stroke is not detected at the fifth scan of this zone. The above conditions for generating a zone 2 to 3 transition pulse have been previously tabulated in Table 1, and of course, could be altered depending on the type print the optical character reader is to read.

Both the OR gate 284 and AND gate 273 are coupled through an OR gate 286 to a zone counter 288. The zone counter 288 has three output terminals, a zone 1, a zone 2 and a zone 3 terminal. A count of zero produces an output from the zone 1 terminal indicating that zone 1 of a character is being scanned. The first pulse output of the OR gate 286 causes a one to be counted and produces an output from the zone 2 terminal of the counter 288, indicating that zone 2 of a character is being scanned. The second pulse output of OR gate 286 causes a two to be counted and produces an output from the zone 3 terminal of the counter 288 indicating that zone 3 of a character is being scanned.

*First and second shift register*

The first shift register 136 (FIGURE 7*d*) receives all of the black elements scanned in the first two scans of zone 1. As the first scan in zone 1 goes through the trace and retrace interval of the scanning cycle, the black elements stored in the shift register 136 are advanced through the twenty-one stages of the shift register twice. This is because there are thirty-four elements in the trace interval and the equivalent of eight elements in the retrace interval, totaling forty-two elements in a complete scanning cycle. When the second scan of a stroke occurs in zone 1, the first black element in this scan arrives at the OR gate 137 coincidently with the first black element of the first scan, which is fed back to the first stage from the twenty-first stage of the first shift register 136. Thus if a black element occurs in either scan, a black element will be stored. This closed loop feedback of the shift register 136 effectively integrates the black elements in the first two scans of a character and fills in black elements that might be missing in one scan. This feature enables the character recognition system to recognize characters even if the transport mechanism 10 (FIGURE 1) causes a character skew. Thus if only a portion of a vertical stroke is scanned during the first scan, the missing black elements in this scan are filled in by the feedback loop during the second scan. The character recognition system of FIGURE 7 can tolerate a skew on the order of 6°.

When the zone counter 288 (FIGURE 7*c*) in the zoning circuit 270 counts a zone 1 to 2 transition pulse, the removal of the output from the zone 1 terminal thereof causes the AND gate 148 in the shift register control circuit 140 (FIGURE 7*a*) to be blocked and no further information is fed from the preliminary storage shift register 134 to the first shift register 136. Similarly if during the first two scans of any character the stroke counter 254 in the character classifier circuit 250 (FIGURE 7*c*) counts two strokes, the flip-flop 152 in the shift register control circuit 140 is set and the AND gate 148 also blocked. Thus no information other than that which scanned in zone 1 is stored in the first shift register 136 (FIGURE 7*d*), and furthermore if the first two scans in zone 1 each detect a stroke, only the first two scans are stored.

The information scanned during zone 2 and/or zone 3 is stored in the second shift register 138. This shift register also integrates successive scans of a stroke in a manner similar to the shift register 136. If a center stroke is not detected during zone 2, the information stored during each scan of zone 2 is cleared out of the shift register 138 at the end of each scan. If a center stroke is detected in zone 2, it is kept in the shift register 138 and the zone 3 information is also stored therein. If during the scanning of zone 3, the stroke counter 254 (FIGURE 7*c*) which is reset to zero by a zone 2 to 3 transition pulse, has counted two strokes, the flip-flop 158 in the shift register control circuit (FIGURE 7*a*) is set, blocking the AND gate 150 and preventing further information from being stored in the second shift register 138.

*Shift register reset pulse control circuit*

The reset pulses for the first and second shift registers 136 and 138 are derived from a reset pulse control circuit 290 (FIGURE 7*d*). The reset pulse control circuit 290 includes an OR gate 292, one input terminal of which is coupled to the "1" output terminal of a medium center stroke detector flip-flop 348 in a center stroke detector 340 (FIGURE 7*b*), to be described subsequently. The second input terminal of the gate 292 is connected to the OR gate 284 in the zoning circuit 270 (FIGURE 7*c*). The OR gate 284 produces a zone 2 to zone 3 transition pulse. The output of the OR gate 292 is fed to the set terminal of a flip-flop 294 which is reset by an ERP pulse. The "0" output terminal of the flip-flop 294 as well as an $ESTP_3$ pulse are coupled to an AND gate 296. The output of the AND gate 296 is fed through an OR gate 298 to a common reset terminal of the second shift register 138. Additionally, an ERP pulse is applied directly to a common reset terminal of the first shift register 136 and also is coupled through the OR gate 298 to reset the shift register 138. Thus the first shift register 136 is only reset when an ERP pulse is generated in the ERP pulse control circuit 230 (FIGURE 7*c*). The second shift register 138 is reset not only when an ERP pulse is generated but also at the end of every scan in zone 1. This is because the flip-flop 294 remains in the reset condition, and thus enables the AND gate 296 permitting every $ESTP_3$ pulse to reset the register 138, until a center stroke is detected in zone 2 or a zone 2 to zone 3 transition pulse is generated. When a stroke is detected in zone 2, all the remaining information in zone 2 and zone 3 is stored in the second register 138 because the flip-flop 294 is set and the AND gate 296 blocked.

*Advance pulse control circuit 300*

The advance pulses for the first and second shift registers 136 and 138 are derived from an advance pulse control circuit 300 (FIGURE 7*d*). The advance pulse control circuit 300 includes a pair of AND gates 302 and 304 to which are applied a train of clock pulses having a frequency of 900 kc. and which are derived from the pulse generator 102 (FIGURE 7*a*). The clock pulses are also applied to the preliminary storage shift register 134 to comprise the advance pulses therefor. It is to be noted that with the frequency of 900 kc., the clock pulses have a period of 1.1 microseconds or one clock pulse for each element in the scanning raster. The outputs of the AND gates 302 and 304 (FIGURE 7*d*) are coupled through an OR gate 306 to apply the advance pulses to each of the shift registers 136 and 138. The AND gate 302 is the generator of the advance pulses during the scanning period while the AND gate 304 is the generator of advance pulses at the end of scanning a character. Thus, the second input to the AND gate 302 is derived from a recognition timing circuit 310 and specifically from "0" output terminal $\overline{REC}$ o fa flip-flop 312 therein. The symbol $\overline{REC}$ denotes the interval during the scanning of a character, while the symbol REC denotes the period when the character recognition system goes through the process of recognizing a character and during which time video signals are blanked.

*Recognition timing circuit*

The flip-flop 312 in the recognition timing circuit 310 (FIGURE 7*d*) is initially reset by an ERP pulse derived from the start pulse and consequently keeps the AND gate 302 enabled to be activated by each pulse in the train of clock pulses until the flip-flop 312 is set. The recognition timing circuit also includes an OR gate 314, the output of which is coupled to the set terminal of the flip-flop 312. The "1" output terminal of the flip-flop 312 produces the recognition timing level REC in response to the OR gate 314 output. The OR gate 314 produces an output when (1) the flip-flop 158 in the shift register control circuit 140 (FIGURE 7*a*) is set by two strokes being counted in zone 3, (2) an end character pulse is derived from the end character pulse circuit 320 (to be described) or (3) an AND gate 315 indicates that four scans have been counted by the scan counter 178 in zone 3 regardless of the information detected in the scans.

The recognition signal from the "1" output terminal of the flip-flop 312 is also applied to an AND gate 311. A delayed timing pulse $ESTP_5$ comprises the other input to the gate 311. The timing pulse $ESTP_5$ is delayed sufficiently long, as will be described in more detail subsequently, to permit the feature detectors and storage mediums in the recognition system to go through a positioning cycle before the AND gate 311 produces an output. The output of the AND gate 311 is applied to activate a decoder 350 which recognizes a character from the various feature signals applied thereto.

The output of the AND gate 311 is also applied to the set terminal of a flip-flop 313 which is reset by an ERP pulse. The "1" output terminal of the flip-flop 313 is coupled to one input of an AND gate 317, the other inputs of which comprise an $ESTP_2$ pulse from the pulse generator 102 and a signal level from the "0" output terminal of the output flip-flop 212 in the start character detector circuit 200 (FIGURE 7*a*). The output of the AND gate 317 is applied as an input to the OR gate 238 in the ERP control circuit 230 (FIGURE 7*c*). The AND gate 317 causes an ERP pulse to be produced after a character has been recognized and moved out of the scanning area.

*End character pulse circuit*

The end character pulse is derived from the end character pulse circuit 320 (FIGURE 7*d*). The end character pulse circuit 320 includes an AND gate 322, the inputs of which are derived from the B signal output terminals of the first and second stages of the shift register 134 (FIGURE 7*a*). The output of the AND gate 332 is coupled to the set input terminal of a flip-flop 324. The flip-flop 324 is set whenever a pair of black elements appear simultaneously in the first and second stages of the shift register 134. The flip-flop 324 is reset at the end of every scan by an $ESTP_2$ pulse. The "0" output terminal of the flip-flop 324 is coupled to an AND gate 325 in conjunction with an $ESTP_1$ pulse to supply an advance pulse to a counter 326 on every scan which does not detect two successive black elements (in effect a white scan). The "1" output terminal of the flip-flop 324 is coupled to reset the counter 326 to zero wherever two black elements are detected in a scan. Thus, the counter 326 effectively counts the number of successive scans in which no feature signals occur. The counter 326 has three output terminals denoting a count of one (C1), two (C2), and three (C3). The output terminals (C1), (C2), and C3) of the counter 326 are coupled respectively to the AND gates 328, 330 and 332. The outputs of the AND gates 328, 330 and 332 are coupled to an OR gate 334, the output of which is an end character pulse.

The second input to the AND gate 332 is derived from the zone 2 terminal of the zone counter 288 (FIGURE 7*c*) and therefore whenever the counter 326 counts three successive scans without feature signal information in zone 2, the OR gate 334 produces an end character pulse. The other input of the AND gate 330 is derived from the zone 3 output terminal of the zone counter 228. Thus, whenever the counter 326 counts two successive scans without feature signal information in zone 3, the AND gate 330 produces an end character pulse.

Additionally, the end character pulse circuit 320 includes an AND gate 336, the inputs of which are derived from zone 3 of the zone counter 288 as well as the count of 3 terminal (SC3) from the scan counter 178 (FIGURE 7*a*). A scan count of 3 in zone 3 causes the AND gate 336 to set a flip-flop 338. The "1" output terminal of the flip-flop 338 is coupled to the second input terminal of the AND gate 328 while the remaining input thereto is derived from the zone 3 terminal of the zone counter 288. Thus, the absence of feature signal information in any scan after the third scan of zone 3 will also produce an end character pulse. The flip-flop 338 is reset by an ERP pulse.

*Center stroke detector*

In the center portion, or zone 2, of a character various features are searched for and detected to distinguish one character from another. A center stroke detector 340 (FIGURE 7*b*) is included to detect vertical strokes in zone 2 of a character. The center stroke detector includes a pair of AND gates 341 and 343, the outputs of which are coupled respectively to the reset and set terminals of a flip-flop 345. The inputs to the AND gate 341 are derived from the scan count of one (SC1) terminal of the scan counter 178 (FIGURE 7*a*) and the zone 2 terminal of the zone counter 288 (FIGURE 7*c*). The inputs to the AND gate 343 are derived from the count of four (SC4) terminal of the scan counter 178 and the zone 1 terminal of the zone counter 288. The center stroke detector 340 also includes a second pair of AND gates 342 and 344, each of which includes an input terminal coupled to the zone 2 terminal of the zone counter 288. The second input to the AND gate 342 is derived from the long vertical stroke detector flip-flop 198 in the vertical stroke detector circuit 180 (FIGURE 7*c*), while the second input to the AND gate 344 (FIGURE 7*b*) is derived from the medium vertical stroke detector flip-flop 194 in the stroke detector circuit. The remaining input to each of the AND gates 342 and 344 is derived from the "0" output terminal of the flip-flop 345. The outputs of the gates 342 and 344 are coupled to the set terminals of a pair of flip-flops 346 and 348 respectively. Both of the flip-flops 346 and 348 are reset by an ERP pulse. The "1" output terminals of the flip-flops 346 and 348 are coupled to a character decoder 350 (FIGURE 7*b*) to be described subsequently.

The AND gates 342 and 344 are activated only in zone 2 when either a long vertical stroke (LVS) or a medium vertical stroke (MVS) is detected respectively. The outputs of the AND gates 342 and 344 set the flip-flops 346 and 348 respectively, denoting a long center stroke (LCS) and a medium center stroke (MCS) respectively.

The AND gates 341 and 343 and the flip-flop 345 prevent a stroke detected in the fourth scan in zone 1 of a strong character from being interpreted as a center stroke.

*Black crossing detector*

In the center zone of a character, the presence and number of horizontal strokes or black crossings are also detected. A black crossing is effectively defined as a transition from two successive white elements to a black element in a scan line. The black crossing detector 360 (FIGURE 7*b*) includes an AND gate 362 having three input terminals. Two input terminals are coupled to the $\overline{B}$ signal output terminals of the second and third stages of the preliminary storage shift register 134 (FIGURE 7*a*), while the third input terminal is coupled to the B signal output terminal of the first stage of this register. The AND gate 362 is therefore activated when the second and third stages of the shift register 134 include white elements and the first stage includes a black element. The output of the AND gate 362 is coupled to a black crossing counter 364 which counts every time the AND gate 362 is activated. The counter 364 is reset to zero at the end of every scan by an $ESTP_4$ pulse from the pulse generator 102 (FIGURE 7*a*). The output of the black crossing counter 364 includes a count of one (C1), two (C2), and three (C3) terminals for indicating whether one, two, or three black crossings were counted in a scan. The C1, C2, and C3 terminals are coupled respectively to AND gates 366, 368 and 370. The other input of each of the AND gates 366, 368 and 370 is derived from an AND gate 372. The AND gate 372 is activated at the end of every scan by an $ESTP_3$ pulse when in zone 2 of a character. Thus, the outputs of the AND gates 366, 368 and 370 indicate respectively whether one, two or three black crossings occurred in each scan in zone 2 of a character.

The ouputs of the AND gates 366, 368 and 370 are coupled through OR gates 361, 363, and 365 respectively to a one black crossing (1BC) counter 374, a two black crossing (2BC) counter 376 and a three black crossing (3BC) counter 378 respectively. All of these counters are reset to zero by an ERP pulse. The counter 374 counts the total number of single black crossings that occur during all of the scans of a character in zone 2, while the counters 376 and 378 do the same for the total number of two and three black crossings respectively.

The count of seven (C7) output terminals of the counters 374, 376, and 378 are coupled to an OR gate 367. The ouput of the OR gate 367 is coupled through an inverter 369 to one input of an AND gate 371. The other inputs to the AND gate 371 comprise a train of clock pulses derived from the pulse generator 102 (FIGURE 7*a*) and a recognition signal REC derived from flip-flop 312 in the recognition timing circuit 310 (FIGURE 7*d*). The output of the AND gate 371 comprises the other input to each of the OR gates 361, 363, and 365. Additionally, the count of seven (C7) output terminals of the one and two black crossing counters 374 and 376 are coupled through inverters 375 and 377 respectively to an AND gate 379 while the count of seven (C7) output terminal of the counter 378 is coupled directly to the AND gate 379. The output of the AND gate 379 as well as the C7 terminal of the counter 374 are coupled to the decoder 350.

The number of black crossings in each scan line are counted in the counter 364, at the end of every scan in zone 2, and the count in the counter 364 is transferred to one of the counters 374, 376 or 378. During the recognition time, the counters 374, 376, and 378 are compared to determine which counter has the highest count. Thus, the AND gate 371 is activated by the recognition signal REC and the counters are advanced by the clock pulses until one or more of them produces an output at their count of seven (C7) terminal. The output of the counters is inverted in the inverter 369 and disables the AND gate 371, preventing a further advancement of the counters. If the 3 black crossing counter 378 reaches a count of seven first, indicating that more three black crossings were detected than one or two black crossings, the AND gate 379 is activated and the output thereof applied to the decoder 350. If the counter 376 has the highest count, no signal is transmitted to the decoder 350 since a two black crossing signal is not required in the decoder 350. If the counter 374 has the highest count, a one black crossing signal is transmitted to the decoder.

It is to be noted that if the counts are equal, a one black crossing count takes precedence over a two or three black crossing count while similarly a two black crossing count takes precedence over a three black crossing count. An output from either or both of the counters 374 and 376 is inverted in the inverters 375 and 377 respectively to disable the AND gate 379 and prevent a signal from being transmitted therefrom. Thus, the number of one, two, and three black crossings occurring in zone 2 of a character are compared and the highest count determines the recognition decision.

*White gap detector*

In the center zone 2 of a character, the spacing between the black crossings and thus the length of a white gap in a character is also detected in a white gap detector circuit 380 (FIGURE 7*b*). The white gap detector 380 includes an AND gate 382 having three input terminals. Two of the input terminals are coupled to the $\overline{B}$ signal output terminals of the first and second stages of the preliminary storage shift register 134 (FIGURE 7*a*), while the third input terminal is coupled to the B signal output terminal of the third stage of this register. The AND gate 382 is activated whenever a black element appears in the third stage of the shift register 134 and is followed by a pair of white elements in the first two stages of the shift register. Thus, a black element followed by two white elements denotes the beginning of a white gap. The output of the AND gate 382 is coupled to a one-shot multivibrator 384. The output of the multivibrator circuit 384 as well as the output of the AND gate 362 in the black crossing detector circuit 360 are coupled to an AND gate 386. The AND gate 386 is in turn coupled through an OR gate 381 to the set input terminal of a flip-flop 388, which flip-flop is reset by an $ESTP_4$ pulse. The other input to the OR gate 381 is derived from an AND gate 383, two inputs to which are derived from a pair of OR gates 385 and 387. The inputs to the OR gate 385 are derived from the B signal output terminals of the twentieth and twenty-first stages of the first shift register 136 while the inputs to the OR gate 387 are derived from the B signal output terminals of the twelfth and thirteenth stages of this register. The remaining input to the AND gate 383 is derived from the AND gate 362 in the black crossing detector 362.

The "1" output terminal of the flip-flop 388 is coupled to one input of an AND gate 390 while the "0" output terminal of the flip-flop 388 is coupled to an input of an AND gate 392. The other inputs of the AND gates 390 and 392 are derived from the output of the AND gate 372 in the black crossing detector circuit 360. It is to be recalled that the AND gate 372 is activated only at the end of every scan in zone 2 of a character. The output of the AND gate 390 is applied through an OR gate 389 to advance a short white gap (SWG) counter 394 while the output of the AND gate 392 is applied through an OR gate 391 to advance a long white gap (LWG) counter 396. The counters 394 and 396 are reset to a count of zero by an ERP pulse.

The count of seven (C7) output terminals of the counters 394 and 396 are coupled through an OR gate 393 to an inverter 395. The output of the inverter 395 comprises one input of an AND gate 397, the other two inputs of which are a recognition signal from the flip-flop 312 in the recognition timing circuit 310 (FIGURE 7*d*) and a train of clock pulses from the pulse generator 102 (FIGURE 7*a*). The output of the AND gate 397 comprises the other input to the OR gates 389 and 391. The count of seven (C7) terminal of the SWG counter 394 is coupled through an inverter 399 to one input of an AND gate 401 while the (C7) terminal of the LWG counter 396 is coupled directly to the other input of the gate 401. The output of the gate 401 is applied to the decoder 350.

The 1 shot multivibrator 384 is a device having an astable state of operation to which it is triggered by a pulse from the AND gate 382. The multivibrator remains in its astable operating state for 5 microseconds. In the astable state, the multivibrator 384 produces an output level which, in conjunction with the output of the AND gate 362, activates the AND gate 386.

When a black element is followed by two white elements in the register 134, the AND gate 382 provides an output to trigger the multivibrator 384 to its astable operating state. The multivibrator remains operating in this state for approximately 5 microseconds or slightly more than four elements in a scan line and therefore keeps the AND gate 386 enabled during this time. If the AND gate 362 in the black crossing detector 360 detects a black crossing during this interval, the AND gate 386 is activated and the flip-flop 388 is set. Thus, a short white gap is detected. If the AND gate 362 is not enabled during the time the multivibrator 384 is operating in its astable state, the multivibrator 384 switches back to its stable state without setting the flip-flop 388. Therefore, a long white gap is effectively indicated. It is to be noted from the font of FIGURE 3 that if there is a horizontal stroke or black crossing in the middle of a perfectly formed character, it occurs before the multivibrator 384 switches back from its astable operating state.

If black elements stored in the first shift register 136 activate the OR gates 385 and 387 when the AND gate 362 detects a black crossing, then the flip-flop 388 will be set and a short white gap detected. This prevents a numeral 8 with both the top and bottom horizontal strokes missing from being misread.

The SWG counter 394 counts the number of times during zone 2 that the flip-flop 388 has been set, while the LWG counter 396 effectively counts the number of times the flip-flop 388 has not been set. During the recognition time, the AND gate 397 is activated and the clock pulses advance the counters until one or both produce an output from the count of seven (7) terminal. This output is inverted in the inverter 395 and disables the AND gate 397 preventing a further advancement of the counters. If the count in the LWG counter 396 is higher than in the SWG counter 394, a signal is transmitted to the decoder 350. If the count in the SWG counter is higher, no signal is transmitted to the decoder 350. If the counts are equal, no signal is transmitted since the output of the inverter 399 disables the AND gate 401. Thus, a short white gap takes precedence over a long white gap.

*Width detector*

The width detector 400 is set by a signal denoting the occurrence of video signals in zone 3 of a character, which signal is derived from an AND gate 405. The inputs to the AND gate 405 are derived from the zone 3 output terminal of the zone counter 288 in the zoning circuit 270 (FIGURE 7*c*) and the "1" output terminal of the flip-flop 324 in the end character pulse circuit 320 (FIGURE 7*d*). It is to be recalled that the flip-flop 324 is set on each scan which contains black video signals. The width detector flip-flop 400 is reset by an ERP pulse.

*Positioning circuit general*

At the end of a character and during the recognition time, a positioning circuit 410 (FIGURE 7*d*) is used to align the black elements stored in the first and second shift registers 136 and 138 into their proper storage locations. The positions of the black elements in the shift registers at the end of scanning a character is random and to correctly position them the registers are advanced until the top of a character reaches a predetermined position.

*Positioning circuit (detail)*

The positioning circuit 410 is shown in detail in FIGURE 9 and includes an AND gate 411, the input terminals of which are coupled to the $\overline{B}$ output terminals of the second, third, and fourth stages of the first and second shift registers 136 and 138. For convenience, the connections are referenced 2B–F and 2B–S when connected to the second stages of the first and second shift registers 136 and 138 respectively, etc. A similar notation is used for the other gates in FIGURE 9. The positioning circuit 410 also includes a plurality of OR gates 412, 414, 416 and 418 which are coupled to the B signal output terminals of the fifteenth stages, the sixteenth stages, the seventeenth stages and the eighteenth stages of both shift registors 136 and 138 respectively. The outputs of the OR gates 412 through 418 are applied respectively to one input terminal of the AND gates 420, 422, 424 and 426. These input terminals are energized when black elements are detected by the OR gates 412 through 418, as indicated by the symbol B. The other inputs of the AND gate 420 are derived from the $\overline{B}$ signal output terminals of the sixteenth, seventeenth and eighteenth stages of the shift registers 136 and 138 and the output terminal of an OR gate 413. The other inputs to the AND gate 422 are derived from the $\overline{B}$ signal output terminals of the first, second, third, seventeenth, eighteenth and nineteenth stages of both shift registers. Similarly, the other inputs to the AND gate 424 are derived from the first, second, eighteenth, nineteenth, twentieth and twenty-first stages of both shift registers while the other inputs to the AND gate 426 are derived from the first, nineteenth, twentieth, and twenty-first stages of the shift registers.

The outputs of the AND gates 420 through 426 are applied to an OR gate 428. Additionally, the output of the AND gate 420 is applied to the reset terminal of a flip-flop 415, the set terminal of which is coupled to the output terminal of the OR gate 314 in the recognition timing circuit 310 (FIGURE 7*d*). The "1" output terminal of the flip-flop 415, as well as the output terminal of the AND gate 411 are coupled to the input terminals of the OR gate 413. The "0" output terminal of the flip-flop 415, the output of the OR gate 428, and a recognition level signal REC from the flip-flop 312 (FIGURE 7*d*) are coupled to an AND gate 429, the output of which is coupled to the set terminal of a flip-flop 430 (FIGURE 7*d*). The flip-flop 430 is reset by an ERP pulse. The "0" output terminal of the flip-flop 430 is coupled to one input of the AND gate 304 in the advance pulse control circuit 300 (FIGURE 7*d*).

At the end of scanning a character, the flip-flop 415 (FIGURE 9) and the flip-flop 312 in the recognition timing circuit 310 (FIGURE 7*d*) are set by a pulse from the OR gate 314. The flip-flop 312 produces a recognition time signal REC from the "1" output terminal thereof. This signal activates the AND gate 304 inasmuch as the flip-flop 430 (FIGURE 7*d*) is in the reset condition due to a prior ERP pulse and the clock pulses are continuously applied to the gate 304. The AND gate 302 is disabled. The AND gate 304 now produces advance pulses for application to the first and second shift registers 136 and 138 until the flip-flop 430 is set. The flip-flop 430 is set when the feature signals stored in the registers 136 and 138 are correctly positioned. When the flip-flop 430 is set, the AND gate 304 is blocked and no further advance pulses are applied to the shift registers 136 and 138. Thus, the setting of the flip-flop 430 inhibits the advance pulses and fixes the positioning of the black elements of the feature signals in the shift registers.

The feature signals are correctly positioned when the elements corresponding to the top of a character are positioned in one of the fifteenth through eighteenth stages of the shift registers. Thus, the position of the top of a character is not constant for all characters in order to compensate for the height variations in characters printed by high-speed computers.

Referring again to FIGURE 9, it will be assumed that in scanning the numeral 2 in FIGURE 2 that at the end of scanning, the feature signals from zone 1 and zone 3 were stored in the shift registers 136 and 138 respectively as shown in column 1. The black dots represent the stored black elements at the time the recognition level signal is produced. It is to be noticed from column 1 that the positioning of the black elements is at random and a portion of the lower left stroke of the numeral 2 appears in the twenty-first stage of the shift register 138 as well as in the first seven stages thereof.

The positions of the black elements shown in column 1 will not set the flip-flop 430 and thereby position the character because none of the OR gates 412 through 418 are energized. The first advance pulse produced during the recognition time positions the black elements as shown in column 2. The character is still not positioned. The next advance pulse advances the black elements to the position shown in column 3. In the column 3 position, the top of the character causes the OR gate 412 to produce an output pulse and the AND gate 420 is activated. The gate 420 is activated because of the absence of black elements in the sixteenth, seventeenth, and eighteenth stages of both shift registers 136 and 138 and the presence of the "1" output signal from the flip-flop 415. An output pulse from the AND gate 420 resets the flip-flop 415 and the "0" output terminal thereof applies an enabling signal to the AND gate 429. The top of the character has therefore been located. The next advance pulse shifts the black elements to the column 4 position. The OR gate 414 is activated but the AND gate 422 is blocked by the black element in the third stages of the shift registers 136 and 138.

The fifth advance pulse centers and correctly positions the character. The black elements at the top of the character activate the OR gate 416 and the absence of black elements in the first, second, and eighteenth through twenty-first stages of both shift registers cause the AND gate 424 to be activated. The output of the AND gate 424 activates the gates 428 and 429 and sets the flip-flop 430. The setting of the flip-flop 430 disables the AND gate 304 in the advance pulse control circuit 300 (FIGURE 7*d*) and no further advance pulses are applied to the shift registers. Additionally, the setting of the flip-flop 430 produces a signal, referenced T, from the "1" output terminal thereof, denoting that the character feature signals are correctly positioned in the shift registers 136 and 138.

It is to be noted that the positioning circuit 410 involves two positioning steps for full height characters. The first step comprises the locating of the top of a character by the gates 417 and 420 and the second step comprises the centering of the character in the shift registers by the gates 422, 424 and 426.

For less than full height characters, the positioning circuit 410 involves only one step. With such character, the absence of black elements in the second through fourth stages of both shift registers keeps the AND gate 411 activated when the top of the character is in the fifteenth stages of these registers. Thus, the AND gate 420 remains enabled after the flip-flop 415 is reset and produces a setting signal for the flip-flop 430 (FIGURE 7*d*).

*Stroke detectors*

Stroke detectors are coupled to the first and second registers 136 and 138 (FIGURE 7*d*) to determine the presence of strokes in these shift registers. An upper right stroke detector 440 is coupled to the B signal output terminals of the eleventh through sixteenth stages of the first shift register 136 to detect an upper right stroke which occurred in zone 1. The upper right stroke detector 440 is defined by the equation $$(1)\quad URS=(15B+16B)\cdot(14B+13B)\cdot(12B+11B)$$

Thus, it is apparent that if black elements are stored in either the eleventh or twelfth stages, and in either the thirteenth or fourteenth stages, and in either the fifteenth or sixteenth stages of the first shift register 136, an upper right stroke will be detected.

Similarly, a lower right stroke detector 442 (FIGURE 7*d*) is coupled to the fifth through tenth stages in the first shift register 136 to detect the storage of a lower right stroke in a manner similar to that of the detector 440. The lower right stroke detector is defined by the equation $$(2)\quad LRS=(5B+6B)\cdot(7B+8B)\cdot(9B+10B)$$

An upper left 444 and a lower left 446 stroke detector (FIGURE 7*d*) are coupled to the second shift register 138 to detect upper and lower left strokes in zone 3 of a character. These detectors are defined by the equations $$(3)\quad ULS=(15B+16B)\cdot(14B+13B)\cdot(12B+11B)$$

$$(4)\quad LLS=(5B+6B)\cdot(7B+8B)\cdot(9B+10B)$$

The outputs of the stroke detectors 442 through 446 are coupled to the character decoder 350.

*Height detector*

A height detector 450 (FIGURE 7*d*) is coupled to the first and second shift registers to detect the height of the characters. The height detector is defined by the equations $$(5)\qquad H_3=(T)\cdot(4_F+4_S+5_F+5_S)$$

$$(6)\qquad H_2=(T)\cdot(\overline{H_3})\cdot(8_S+9_S)\cdot(7_F+8_F+9_F)$$

$$(7)\qquad H_1=(T)\cdot(\overline{H_3})\cdot(\overline{H_2})$$

wherein $(T)$=A signal derived from the flip-flop 430 and denotes that the character is correctly positioned in the first and second shift registers 136 and 138.

$4_F$=The B signal output of the fourth stage of the first shift regiser 136 and $4_S$=The B signal output of the fourth stage of the second shift regsiter 138, etc.

$(\overline{H_3})$=The inverse of an $H_3$ signal, etc.

*Decoder and encoder*

All of the information from the various detectors are applied to a character decoder 350 (FIGURE 7*b*) during the recognition time. The character decoder 350 corresponds physically to the elements of the truth table shown in FIGURE 10 and may for example be a diode matrix decoder or comprise a plurality of AND gates. A separate one of the AND gates is utilized for each line of the truth table (FIGURE 10) and a plus sign (+) denotes the presence of the corresponding feature signal while a minus sign (−) denotes the absence of the corresponding feature signal. It is to be noted that this truth table is much simpler than that shown in FIGURE 5. The character decoder, after recognizing the various inputs thereto as a particular character, produces an output which is applied to an encoder 450 which may be a diode matrix encoder. The encoder 450 (FIGURE 7*b*) codes the signals representative of the characters into a machine language or a code form. The encoder is coupled to the output circuit 20 (FIGURE 7*b*) to apply the coded signal output thereto. The output circuit may, for example, comprise a storage medium for storing the characters for later use or a computer for further processing the information. All of the individual circuit components described in FIGURES 7*a* through 7*d* and FIGURE 9 comprise known circuits.

*Operation*

In describing the operation of the character recognition system of FIGURE 7, it will be assumed that the numeral 2, as shown in FIGURE 2, is being scanned. The scan lines have been numbered (beginning at the right) from 1 through 10 for convenience in explanation. The pick-up device 16 detects black elements in the first scan line 1 of FIGURE 2 beginning at the ninth row of the raster 25. The black elements, detected in this scan line will be advanced into the preliminary storage shift register 134 (FIGURE 7*a*). The AND gate 144 in the shift register control circuit 140 is activated by the first two successive black elements and the output of the AND gate 144 is coupled through the OR gate 146 to activate the AND gates 148 and 150. The AND gate 148 is activated since the zone counter 288 (FIGURE 7*c*) is reset to zone 1 due to an ERP pulse produced (as by the start pulse) prior to the arrival of the numeral 2 in the scanning area. Similarly, the flip-flops 152 and 158 in the shift register control circuit 140 (FIGURE 7*a*) are also reset by the ERP pulse. Thus, both the AND gates 148 and 150 produce signals to set the flip-flops 154 and 162. The setting of the flip-flops 154 and 162 enables the AND gates 156 and 164, respectively, so that when the initial black element in the first scan line arrives in the fourth stage of the shift register 134, it is passed by both the AND gates 156 and 164. Thus, the first black element is coupled through the OR gates 137 and 139 respectively to the first stages of the first and second shift registers 136 and 138 (FIGURE 7*d*). As the pick-up element scans the remaining black elements in the first scan line, the succession of black elements will be advanced into both the first and second shift registers 136 and 138 by the advance pulses derived from the advance pulse control circuit 300 (FIGURE 7*d*).

Concurrently with the arrival of the first black element at the first stage of the shift register 134, the AND gate 184 in the vertical stroke detector circuit 180 (FIGURE 7*c*) is activated. The output of the AND gate 184 is coupled through the OR gate 188 and sets the flip-flop 186. The setting of the flip-flop 186 blocks the input AND gate 184 and enables the AND gate 192. The output of the OR gate 188 is applied to the five element delay circuit 190 and, since no successive pair of white elements appears to reset the flip-flop 186 and block the delay circuit 190, the AND gate 192 remains enabled by the time an output appears from the delay circuit 190. Thus, the delayed pulse will pass through the AND gate 192 and set the medium vertical stroke detector flip-flop 194. Additionally, the pulse output of the AND gate 192 is also fed back through the OR gate 188 to the delay circuit 190 a second time. The arrival of a pair of white elements (detected at the 17th and 18th rows of the raster 25 in scan line 1 of FIGURE 2) activates the AND gate 182 (FIGURE 7*c*) and resets the flip-flop 186. Thus, the delay circuit 190 and the AND gate 192 are blocked and the feedback pulse does not set the long vertical stroke flip-flop 198.

The setting of the medium vertical stroke detector flip-flop 194 produces an output from the "1" terminal thereof which is fed through the OR gate 210 in the start character detector circuit 200 (FIGURE 7*a*), denoting the start of a character. The setting of the flip-flop 212 blocks the AND gates 232, 234 and 236 in the end reset pulse control circuit 230 (FIGURE 7*c*) and prevents the generation of ERP pulses until the flip-flop 212 is reset by an end character pulse.

Concurrently with the above, the activation of the AND gate 144 in the shift register control circuit 140 (FIGURE 7*a*) causes the flip-flop 172 in the scan counting circuit 170 (FIGURE 7*a*) to be set. The signal produced by the "1" output terminal thereof is coupled through an OR gate 174 to the AND gate 176. The arrival of an $ESTP_1$ pulse causes the AND gate 176 to be activated and the scan counter 178 counts the first scan.

The setting of the medium vertical stroke detector flip-flop 194 causes the AND gate 252 in the character classification circuit 250 (FIGURE 7*c*) to be activated when an $ESTP_2$ pulse arrives at the end of the first scan. The stroke counter 254 therefore counts one stroke.

At the end of the first scan, the second shift register 138 is reset by a reset pulse derived from the AND gate 296 in the shift register reset pulse control circuit 290 (FIGURE 7*d*). The AND gate 296 is enabled by the "0" output level of the flip-flop 294 which is in the reset condition, so that an $ESTP_3$ pulse activates the AND gate 296. Thus, the black elements derived from the first scan of the character 2 are cleared out of the second shift register 138. However, the black elements from this scan are stored in the first shift register 136 inasmuch as an ERP pulse has not been generated to clear this shift register.

The second scan line of the numeral 2 also sets the medium vertical stroke detector flip-flop 194 (FIGURE 7*c*) which is again counted at the end of the scan by the stroke counter 254. The output derived from the count of 2 output terminal (2) of the stroke counter 254 is applied to set the flip-flop 152 in the shift register control circuit 140 (FIGURE 7*a*). The setting of the flip-flop 152 blocks the AND gate 148. An $ESTP_2$ pulse arriving at the end of scan line 2 resets the flip-flop 154 and no further information is fed into the first shift register 136 during the scanning of the numeral 2. Additionally, the black elements derived from the second scan are cleared out of the second shift register 138 by a reset pulse from reset control circuit 290 (FIGURE 7*d*). The scan counter 178 (FIGURE 7*a*) counts the second scan.

The third scan of the numeral 2 in FIGURE 2 does not detect a stroke. Thus, the MVS detector flip-flop 194 (FIGURE 7*c*) remains reset. The "0" output level from the flip-flop 194, when in the reset condition, enables the AND gate 274 in the zoning circuit 270. Thus, the counting of the third scan by the scan counter 178 activates the gates 274 and 272. The AND gate 273 is also activated by the output of the OR gate 272 and an $ESTP_2$ pulse since the gate 273 is enabled by the zone 1 signal from the zone counter 288. Thus, the AND gate 273 produces a zone 1 to zone 2 transition pulse. The zone counter 288 therefore counts the pulse and produces an output from the zone 2 terminal thereof. The scan counter 178 is reset to zero by the transition pulse from the OR gate 286.

The output from the zone 2 terminal of the zone counter 288 is applied to AND gates 341, 342, and 344 in the center stroke detector circuit 340 (FIGURE 7*b*), and the AND gate 372 in the black crossing detector circuit 360. The detectors 360 and 340 therefore count three black crossings and a short white gap respectively, as will be described subsequently. Since no medium vertical stroke was detected in this scan, the flip-flop 294 in the shift register reset pulse control circuit 290 (FIGURE 7*a*) remains reset and the information derived from the third scan is cleared out of the second shift register 138.

The zone 1 to zone 2 transition pulse is also applied from the AND gate 273 to the AND gates 256, 258 and 260 in the character classification circuit 250 (FIGURE 7*c*). Since the stroke counter has counted two strokes, the count of 2 terminal (2) in conjunction with the zone 1 to 2 transition pulse, sets the flip-flop 264. The setting of the flip-flop 264 indicates that a nominal character is being scanned.

The third scan of the numeral 2, which is effectively the first scan of zone 2 of the numeral, produces a first black crossing in rows 9 and 10 of the raster 25 and causes the black crossing counter 364 (FIGURE 7*b*) to count 1. Additionally, the pick-up element in traversing rows 10, 11 and 12 of the raster 25 in FIGURE 2 activates the AND gate 382 in the white gap detector circuit 380 (FIGURE 7*b*) and triggers the one-shot multivibrator 384 to its astable state of operation. The multivibrator 384, in its astable state, enable the AND gate 386 so that the second black crossing detected in the third scan line at rows 13, 14 and 15 in raster 25 (FIGURE 2) activates the gate 386 and sets the flip-flop 388 (FIGURE 7*b*). Simultaneously in black crossing counter 364 counts a second black crossing. As the pick-up element continues to scan this line, the black crossing counter 364 counts a third black crossing. The output from the C3 terminal of the black crossing counter 367 is transferred to the 3 black crossing counter 378 when an $ESTP_3$ arrives at the end of the third scan line. The black crossing counter 364 is then reset to zero by an $ESTP_4$ pulse. The 3 black crossing counter 378 contains a count of 1. Similarly, the short white gap count-394 in the white gap detector circuit 380 also has a count of 1, since the AND gate 390 is enabled by the setting of the flip-flop 388 and activated by the pulse output of the AND gate 372 when an $ESTP_3$ pulse arrives.

The fourth scan line, which is the second scan of zone 2, also causes 3 black crossings to be counted by the counter 364 and consequently increases the 1 count to a count of 2 in the 3 black crossing counter 378. Similarly, the SWG counter 394 is also advanced to 2. The fifth and sixth scan lines, which are the third and fourth scans of zone 2, similarly increases the counts in the counters 378 and 394 to a count of 4 respectively.

During the four scans of zone 2 no vertical strokes are detected so that the flip-flop 294 in the reset pulse control circuit 290 (FIGURE 7*c*) remains reset and the black elements stored in the second shift register 138 by each scan are cleared out at the end of each scan. Additionally, the center stroke detector 340 (FIGURE 7*b*) does not detect a stroke.

The seventh scan line increases the count in the scan counter 178 (FIGURE 7*a*) to a count of 4. Therefore, the AND gate 281 in the zoning circuit 270 (FIGURE 7*c*) is activated due to the output from the count of 4 terminal (SC4) of the scan counter 178, and from the nominal character detector flip-flop 264 as well as the $ESTP_2$ pulse. Consequently a zone 2 to zone 3 transition pulse from the OR gate 284 (FIGURE 7*c*) is applied to the zone counter 288 through the OR gate 286 and causes the zone counter 288 output to be switched to the zone 3 terminal. The flip-flop 294 in the shift register reset pulse control circuit 290 is set, thereby removing the reset pulses from the second shift register 138. Thus, the information in this scan line and the remaining information is stored in the second shift register 138.

The transitioin pulse from the OR gate 284 is also applied to reset to zero the stroke counter 254. The switching of the output of the zone counter 288 from the zone 2 to the zone 3 terminal effectively blocks the center stroke detector 340, the black crossing detector 360, and the white gap detector 380 (FIGURE 7*b*). The scan counter 178 is also reset to zero.

The eighth scan of the numeral 2 in FIGURE 2 is essentially the first scan of zone 3 and the black elements occurring in the 9th and 10th, 15th and 16th and 21st and 22nd rows of the raster 25 are stored in the second shift register 138 (FIGURE 7*d*). The ninth scan of the numeral 2 causes a medium vertical stroke to be detected. The black elements in the medium vertical stroke are stored in the second shift register 138 and incorporate the black elements stored from the eighth scan of the raster 25.

On the tenth scan of the numeral 2, the second medium vertical stroke in zone 3 is counted by the stroke counter 254 (FIGURE 7*c*) and the flip-flop 158 in the shift register control circuit 140 (FIGURE 7*a*) is set and prevents further video signals from being applied to the second shift register 138. Additionally, the setting of the flip-flop 158 sets the flip-flop 312 in the recognition timing circuit 310 (FIGURE 7*d*) and starts the recognition time. The black elements stored in the shift registers 136 and 138 are then positioned as previously described in connection with FIGURE 9. The positioning of the black elements causes the lower left 446 and upper right 440 stroke detectors (FIGURE 7*d*) to detect the presence of these strokes in the shift registers 138 and 136 respectively. Additionally, the height detector 450 (FIGURE 7*d*) detects a height of $H_3$.

The recognition signal level activates the AND gates 371 and 397 in black crossing and white gap detectors 360 and 380 and the clock pulses advance the 3 black crossing counter 378 and the SWG counter 394 to a count of seven. The output from the C7 terminal of the counters 378 and 394 disable the AND gates 371 and 397 respectively and the counters 374, 376, 378, 394 and 396 are prevented from advancing further. The AND gate 379 in the black crossing detector 379 is activated because the low output from the counters 374 and 376 is inverted in the inverters 375 and 377. Thus, a 3 black crossing signal and the absence of a 1 black crossing signal is derived from the black crossing detector 360. Additionally, the output from the SWG counter 394 prevents a LWG signal from being generated in the white gap detector 380. Thus, the absence of a long white gap is detected in the white gap detector 380.

The signals from the various feature detectors are applied to the decoder 350. The decoder 350 is activated by a pulse derived from the AND gate 311 in the recognition timing circuit 310. The flip-flop 313 is also set by this pulse. The AND gate 311 is activated by an $ESTP_5$ pulse which is generated in the pulse generator 102 approximately 26 elements or 28.6 microseconds after an $ESTP_1$. This delay is sufficient to permit the positioning circuit 410 to correctly position any character in the shift registers 136 and 138. The decoder 350 synthesizes the various feature signals and provides a manifestation of the identity of the character. The signal output from the decoder 350 is encoded in the encoder 450 for application to the output circuit 20.

The tenth scan of the numeral 2 also sets the flip-flop 338 in the end character pulse circuit 320 (FIGURE 7*d*) since this scan is the third scan counted in zone 3 by the zone counter 178. The eleventh scan does not detect any character feature signals. Therefore, the counter 326 in the end character pulse circuit 320 is advanced to a count of one. The AND gate 328 is activated and an end character pulse is generated. The end character pulse resets the flip-flop 212 in the start character detecting circuit 200 (FIGURE 7*a*).

The signals from the "0" output terminal of the flip-flop 212 and the "1" output terminal output of the flip flop 313 enables the AND gates 317 in the recognition timing circuit 310. The AND gate 317 produces a pulse output when an $ESTP_2$ pulse arrives at the end of the eleventh scan. The pulse output is applied to the OR gate 238 in the ERP pulse control circuit 230 to produce an ERP pulse. The ERP pulse resets the various circuit components to prepare them for the arrival of the next character into the scanning area.

Thus, an optical character reader embodying the invention accurately recognizes characters printed on a document. The character reader tolerates appreciable misalignment of the characters as well as the skewing of the document itself. Distorted characters as well as those varying appreciably in width are also recognized reliably and accurately. An example of some of the distortions that will be accurately read is illustrated in FIGURE 11. The reading of distorted characters is predicated on the emphasis on vertical stroke detection which computer-operated high-speed printers rarely omit. The appreciable variation in width of characters printed by such printers is taken care of by automatically and asynchronously zoning each character and feeding feature signal information to the proper storage devices and detectors.

What is claimed is:

1. In an optical character reading system for reading characters from a document, said characters being formed of one or more distinctive features, the combination comprising
   means for asynchronously zoning said characters, and
   means for storing in the same location feature signals derived from the same zone of a character.

2. In an optical character reading system for reading characters from a document, said characters being formed of one or more distinctive features, the combination comprising
   means for asynchronously zoning said characters based on a selected one of said features, and
   means for storing in the same location feature signals derived from the same zone of a character.

3. In an optical character reading system for reading characters from a document, said characters being formed of one or more distinctive features, the combination comprising
   means for dividing each of said characters into zones, and
   means for varying a dimension of said zones based on a selected one of said features.

4. In an optical character reading system for reading characters from a document, said characters being formed of one or more distinctive features, said system including means for deriving signals representing the features of said characters, the combination comprising
   means for automatically dividing each of said characters into a predetermined number of zones,
   means for detecting the occurrence of a selected one of said features in said zones, and
   means for varying a dimension of said zones based on the occurrence of said selected one of said features.

5. In an optical character reading system for reading characters from a document, said characters being formed of one or more distinctive features, one of said features comprising vertical strokes, said system including means for deriving signals representing the features of said characters, the combination comprising
   means for automatically dividing each character into a predetermined number of zones,
   means for detecting the occurrence of a vertical stroke in said zones, and
   means for varying a dimension of said zones based on the number of times a vertical stroke is detected in one of said zones.

6. In an optical character reading system for reading characters from a document, said characters being formed of one or more distinctive features, the combination comprising
   means for detecting the occurrence of a selected one of said features in said character,
   means for classifying each character into one of a plurality of categories based on the occurrence of said selected feature, and
   means for dividing each of said characters into a predetermined number of zones, said zones having a dimension variedly formed based on the classification of said character.

7. In an optical character reading system for reading characters from a document, said characters being formed of one or more distinctive features, the combination comprising
   means for classifying each character into one of a plurality of categories based on the occurrence of a selected one of said features in said character, and
   means for dividing each of said characters into a predetermined number of zones, said zones having a dimension variedly formed based on the classification of said character.

8. In an optical character reading system for reading characters from a document, said characters being formed of one or more distinctive features, one of said features comprising vertical strokes, said system including means for scanning successive ones of said characters to derive signals representing the features of said characters, the combination comprising
   means coupled to said scanning means to detect the occurrence of said vertical strokes in said characters,
   means coupled to said vertical stroke detecting means for classifying each character into one of a plurality of categories based on the detection of said vertical strokes, and
   means coupled to said classification means for dividing each of said characters into a predetermined number of zones,
   said zones having a dimension variedly formed based on the classification of said character.

9. In an optical reading system for reading characters from a document, said characters being formed of one or more distinctive features, said system including means for scanning successive ones of said characters by a succession of vertical scans to derive signals representing the features of said characters, said vertical scans effectively dividing each of said characters into a raster composed of a plurality of elements, the combination comprising
   shift register storage means including a plurality of stages and having an input and an output terminal,
   means coupling said scanning means to said input terminal to apply selected feature signals to said storage means, means for advancing elements of said selected feature signals into successive stages of said shift register storage means is synchronism with said scanning means, and mean for feeding back from said output terminal to said input terminal, the elements of said feature signals derived from one vertical scan of said character simultaneously with the arrival at said input terminal of corresponding elements from the next successive vertical scan of said character.

10. In an optical character reading system for reading characters from a document, said characters being formed of one or more distinctive features, said system including scanning means for deriving video signals which include feature signal portions representing the features of said characters, the combination comprising preliminary shift register means for preliminarily storing all signals derived from said scanning means, final shift register storage means for storing the feature signals present in said video signals, and shift register control means coupling said preliminary shift register means to said final shift register storage means to pass only the feature signal portions of said video signals, and means coupled to said preliminary shift register to compare feature signals in one scan with feature signals derived from the next successive scan to signal said shift register control means to pass predetermined types of video signals.

11. In an optical character reading system for reading characters from a document, said characters being formed of one or more distinctive features including strokes oriented in vertical and horizontal directions on said document, said characters being divisible into first, second and third horizontal zones, said system including means for scanning successive ones of said characters, zone by zone, by a succession of vertical scan lines to derive signals representing the features of a character, the combination comprising first and second shift registers, shift register control means coupled to said scanning means for directing feature signals derived from the first zone of a character into said first shift register and feature signals derived from the second and third zones into said second shift register, vertical stroke detecting means coupled to said scanning means for detecting the occurrence of vertical strokes in a character, said vertical stroke detecting means denoting the start of scanning a character when a vertical stroke is detected in the first zone of a character, start character detecting means coupled to said scanning means for detecting the start of scanning a character in the absence of a vertical stroke detected in said first zone, vertical stroke counting means coupled to said vertical stroke detecting means for counting the number of times a vertical stroke is detected in the scanning of a character, means coupling said vertical stroke counting means to said shift register control means to block feature signals from entering said first shift register after two vertical strokes are counted in said first zone, character classification means coupled to said vertical stroke counting means for classifying a character into one of a plurality of categories based on the number of times a vertical stroke is counted in the first zone of a character, zone control means coupled to said vertical stroke detecting means and said character classification means for asynchronously generating first and second transition signals denoting respectively the transitions from the first to the second and from the second to the third zones of a character, said first transition signal being generated at the end of a predetermined number of scans in the absence of the detection of a vertical stroke in said first zone and being generated at the end of a vertical stroke when a vertical stroke is detected in said first zone, said second transition signal being generated depending on the classification of said character in said character classification means, means for applying said first transition signal to said shift register control means to switch feature signals derived from the second and third zones of a character into said second storage register, reset means coupled between said stroke detecting means and said second shift register for resetting said second shift register to clear out said feature signals in the absence of the detection of a vertical stroke in in said second zone, center stroke detecting means coupled to said vertical stroke detecting means for providing an indication when a vertical stroke is detected in said second zone, means coupled to said scanning means for counting the number of horizontal strokes occurring in said second zone, means coupled to said scanning means for detecting the gap between said horizontal strokes in said second zone, means for applying said second transition signal to block said reset means to permit feature signals from said third zone to be stored in said second shift register, means coupling said vertical stroke counting means to said shift register control means to block feature signals form entering said second shift register after two vertical strokes are counted in said third zone, and means for synthesizing the feature signals stored in said first and second shift registers, in said horizontal stroke counter, in said center stroke detector, and in said horizontal stroke gap detecting means to provide a manifestation of the identity of the character scanned.

12. In an optical character reading system for reading characters from a document, said characters being formed of one or more distinctive features, one of said features comprising vertical strokes, said system including means for scanning successive ones of said characters to derive signals representing the features of said characters, the combination comprising a stroke detector coupled to said scanning means to detect the occurrence of said vertical strokes in said characters, a plurality of storage devices for storing vertical stroke feature signals and other feature signals, storage control switch means coupled to said scanning means for directing said feature signals into one storage device at a time, classification means coupled to said stroke detector for classifying each character into one of a plurality of categories based on the detection of said vertical strokes, and zoning means coupled to said classification means for asynchronously actuating said storage control switch means based on said classification to switch feature signals away from one storage device and into the next successive storage device so as to effectively divide said character into a plurality of zones.

13. In an optical character reading system for reading characters from a document, said characters being formed of one or more distinctive features, one of said features comprising vertical strokes, said system including means for scanning successive ones of said characters to derive signals representing the features of said characters, the combination comprising a stroke detector coupled to said scanning means to detect the occurrence of said vertical strokes in said characters,
a plurality of storage devices for storing said vertical stroke feature signals and other feature signals,
storage control switch means coupled to said scanning means for directing said feature signals into one storage device at a time,
classification means coupled to said stroke detector for classifying each character into one of a plurality of categories based on the detection of said vertical strokes,
zoning means coupled to said classification means for asynchronously actuating said storage control switch means based on said classification to switch feature signals away from one storage device and into the next successive storage device so as to effectively divide said character into a plurality of zones, and
means coupled to said storage devices for denoting when said vertical strokes are detected in the upper half of a character and when detected in the lower half of a character.

14. In an optical character reading system for reading characters form a document, said characters, being formed of one or more distinctive features, including vertical and horizontal strokes, said system including means for scanning successive ones of said characters to derive signals representing the features of said characters, the combination comprising
a stroke detector coupled to said scanning means to detect the occurrence of said vertical strokes in said characters,
a plurality of storage devices for storing said vertical stroke feature signals and other feature signals,
storage control switch means coupled to said scanning means for directing said feature signals into one storage device at a time,
classification means coupled to said stroke detector for classifying each character into one of a plurality of categories based on the detection of said vertical strokes,
zoning means coupled to said classification means for asynchronously actuating said storage control switch means based on said classification to switch feature signals away from one storage device and into the next successive storage device so as to effectively divide said character into a plurality of zones,
means coupled to said storage devices for denoting when said vertical strokes are detected in the upper half of a character and when detected in the lower half of a character, and
means for counting the horizontal strokes that occur in said characters.

15. In an optical character reading system for reading characters from a document, said characters being formed of one or more distinctive features, one of said features comprising vertical strokes, said system including means for scanning successive ones of said characters to derive signals representing the features of said characters, the combination comprising
a stroke detector coupled to said scanning means to detect the occurrence of said vertical strokes in said characters,
a plurality of storage devices for storing said vertical stroke feature signals and other feature signals,
storage control switch means coupled to said scanning means for directing said feature signals into one storage device at a time,
classification means coupled to said stroke detector for classifying each character into one of a plurality of categories based on the detection of said vertical strokes,
zoning means coupled to said classification means for asynchronously actuating said storage control switch means based on said classification to switch feature signals away from one storage device and into the next successive storage device so as to effectively divide said character into a plurality of zones,
means coupled to said storage devices for denoting when said vertical strokes are detected in the upper half of a character and when detected in the lower half of a character,
means for counting the horizontal strokes that occur in said characters, and
means for measuring the distance between said horizontal strokes.

16. In an optical character reading system for reading characters from a document, said characters being formed of one or more distinctive features, one of said features comprising vertical strokes, said system including means for scanning successive ones of said characters to derive signals representing the features of said characters, the combination comprising
a stroke detector coupled to said scanning means to detect the occurrence of said vertical strokes in said characters,
a plurality of storage devices for storing said vertical stroke feature signals and other feature signals,
storage control switch means coupled to scanning means for directing said feature signals into one storage device at a time,
classification means coupled to said stroke detector for classifying each character into one of a plurality of categories based on the detection of said vertical strokes,
zoning means coupled to said classification means for successively generating zone transition signals,
said transition signals being asynchronously generated based on the classification of said character, and
means for applying each successive transition signal to actuate said storage control means to direct said feature signals away from one storage device and into the next successive storage device.

17. In an optical character reading system for reading characters from a document, said characters being formed of one or more distinctive features including horizontal and vertical strokes, said system including means for scanning successive ones of said characters to derive signals representing the features of said characters, the combination comprising
a stroke detector coupled to said scanning means to detect the occurrence and measure the length of vertical strokes in said characters,
classification means coupled to said stroke detector for classifying each character into one of a plurality of categories based on the detection of said vertical strokes,
zoning means coupled to said classification means for dividing each of said characters into a predetermined number of zones,
said zones being asynchronously formed based on the classification of said character,
shift register storage means coupled to said scanning means for storing vertical stroke signals derived from the vertical strokes that occur in each of said zones,
means coupled to cycle said shift register means at the end of scanning a character to center a vertical stroke signal in a prescribed position corresponding to the position of said vertical stroke within a character,
means coupled to said shift register means to signal the location of said vertical stroke signals, and
means coupled to said scanning means to count the horizontal strokes that occur in said character.

18. In an optical character reading system for reading characters from a document, said characters being formed of one or more distinctive features including horizontal and vertical strokes, said system including means for scanning successive ones of said character to derive signals representing the features of said characters, the combination comprising
a stroke detector coupled to said scanning means to detect the occurrence and measure the length of vertical strokes in said characters, classification means coupled to said stroke detector for classifying each character into one of a plurality of categories based on the detection of said vertical strokes, means coupled to said classification means for dividing each of said characters into a predetermined number of zones, said zones being asynchronously formed based on the classification of said character, shift register storage means coupled to said scanning means for storing vertical stroke feature signals, means coupled to cycle said shift register means at the end of scanning a character to center a vertical stroke signal in a prescribed position corresponding to the position of said vertical stroke within a character, means coupled to said shift register means to signal the location of said vertical stroke signals, means coupled to said scanning means to count the horizontal strokes that occur in said character, and means for measuring the distance between said horizontal strokes.

19. In an optical character reading system for reading characters from a document, said characters being formed of one or more distinctive features including horizontal and vertical strokes, said system including means for scanning successive ones of said characters to derive signals representing the features of said characters, the combination comprising a stroke detector coupled to said scanning means to detect the occurrence of vertical strokes in said characters, classification means coupled to said stroke detector for classifying each character into one of a plurality of categories based on the detection of said vertical strokes, means coupled to said classification means for dividing each of said characters into a plurality of zones, said zones being asynchronously formed based on the classification of said character, a first storage device for storing vertical stroke signals representing the vertical strokes that occur in one of said zones, a second storage device for storing feature signals representing the vertical strokes that occur in the other zones of said characters, means coupled to said storage devices for measuring said vertical stroke signals to determine the location of said vertical strokes within a character, and means coupled to said scanning means to count the number of horizontal strokes that occur in each character.

References Cited by the Examiner

UNITED STATES PATENTS

| | | | |
|---|---|---|---|
| 3,017,625 | 1/1962 | Evan et al. | 340—146.3 |
| 3,104,369 | 9/1963 | Rabinow et al. | 340—146.3 |
| 3,142,824 | 7/1964 | Hill | 340—146.3 |
| 3,167,745 | 1/1965 | Bryan et al. | 340—146.3 |
| 3,210,729 | 10/1965 | Lozier et al. | 340—146.3 |

FOREIGN PATENTS

| | | |
|---|---|---|
| 915,344 | 1/1963 | Great Britain. |
| 916,305 | 1/1963 | Great Britain. |

DARYL W. COOK, *Acting Primary Examiner.*

MALCOLM A. MORRISON, *Examiner.*

J. E. SMITH, *Assistant Examiner.*